United States Patent
Ghosh et al.

(10) Patent No.: US 9,449,585 B2
(45) Date of Patent: Sep. 20, 2016

(54) SYSTEMS AND METHODS FOR COMPOSITING A DISPLAY IMAGE FROM DISPLAY PLANES USING ENHANCED BLENDING HARDWARE

(71) Applicant: nComputing Inc., Santa Clara, CA (US)

(72) Inventors: Subir Ghosh, San Jose, CA (US); Anita Chowdhry, Saratoga, CA (US)

(73) Assignee: nComputing, Inc., Santa Clara, CA (US)

( * ) Notice: Subject to any disclaimer, the term of this patent is extended or adjusted under 35 U.S.C. 154(b) by 336 days.

(21) Appl. No.: 14/255,709

(22) Filed: Apr. 17, 2014

(65) Prior Publication Data

US 2015/0138237 A1    May 21, 2015

Related U.S. Application Data

(63) Continuation-in-part of application No. 14/080,918, filed on Nov. 15, 2013, now Pat. No. 9,142,053.

(51) Int. Cl.
| | |
|---|---|
| G09G 5/397 | (2006.01) |
| G09G 5/393 | (2006.01) |
| G09G 5/36 | (2006.01) |
| G06F 3/14 | (2006.01) |
| G09G 5/02 | (2006.01) |

(52) U.S. Cl.
CPC ............... *G09G 5/393* (2013.01); *G09G 5/36* (2013.01); *G06F 3/1438* (2013.01); *G06F 3/1454* (2013.01); *G09G 5/02* (2013.01); *G09G 5/022* (2013.01); *G09G 5/397* (2013.01); *G09G 2340/02* (2013.01); *G09G 2340/10* (2013.01); *G09G 2340/125* (2013.01); *G09G 2350/00* (2013.01); *G09G 2360/10* (2013.01); *G09G 2360/125* (2013.01); *G09G 2360/127* (2013.01); *G09G 2370/022* (2013.01); *G09G 2370/20* (2013.01)

(58) Field of Classification Search
None
See application file for complete search history.

(56) References Cited

U.S. PATENT DOCUMENTS

| | | | |
|---|---|---|---|
| 4,882,683 | A | 11/1989 | Rupp |
| 5,218,674 | A | 6/1993 | Peaslee et al. |
| 6,002,411 | A | 12/1999 | Dye |
| 6,084,600 | A | 7/2000 | Munshi |

(Continued)

OTHER PUBLICATIONS

"U.S. Appl. No. 14/080,918, Notice of Allowance mailed Jun. 18, 2015", 7 pgs.

*Primary Examiner* — Chante Harrison
(74) *Attorney, Agent, or Firm* — Schwegman Lundberg & Woessner, P.A.

(57) ABSTRACT

An internal matrix corresponding to a representation of a display screen and having transparency data of a macro block is accessed. Display plane data from either a first or second plane is read if the internal matrix indicates the macro block is non-translucent and from both planes when the internal matrix indicates translucency. A high-level external matrix having high-level external transparency data indicating transparency of pixels is accessed if the internal transparency data indicates the macro block includes a window boundary. Display plane data from either the first or second plane is read if the high-level external transparency data indicates a non-translucent pixel and from both planes when the internal matrix indicates translucency. A detailed external matrix is accessed if the internal transparency data indicates the macro block is translucent or if the high-level external transparency data indicates the pixel is translucent. The first and second planes are blended accordingly.

60 Claims, 21 Drawing Sheets

(56) References Cited

U.S. PATENT DOCUMENTS

| | | |
|---|---|---|
| 6,734,873 B1 | 5/2004 | Herf et al. |
| 9,142,053 B2 | 9/2015 | Ghosh et al. |
| 2005/0285870 A1 | 12/2005 | Sirois et al. |
| 2007/0009043 A1* | 1/2007 | Craig .................... A63F 13/12 375/240.24 |
| 2009/0167785 A1* | 7/2009 | Wong .................... G06T 15/503 345/629 |
| 2010/0066762 A1 | 3/2010 | Yeh et al. |
| 2013/0321449 A1 | 12/2013 | Kasuga et al. |
| 2014/0125685 A1 | 5/2014 | Yeh et al. |
| 2015/0138229 A1 | 5/2015 | Ghosh et al. |
| 2015/0310833 A1* | 10/2015 | Zhao .................... G09G 5/022 345/634 |

* cited by examiner

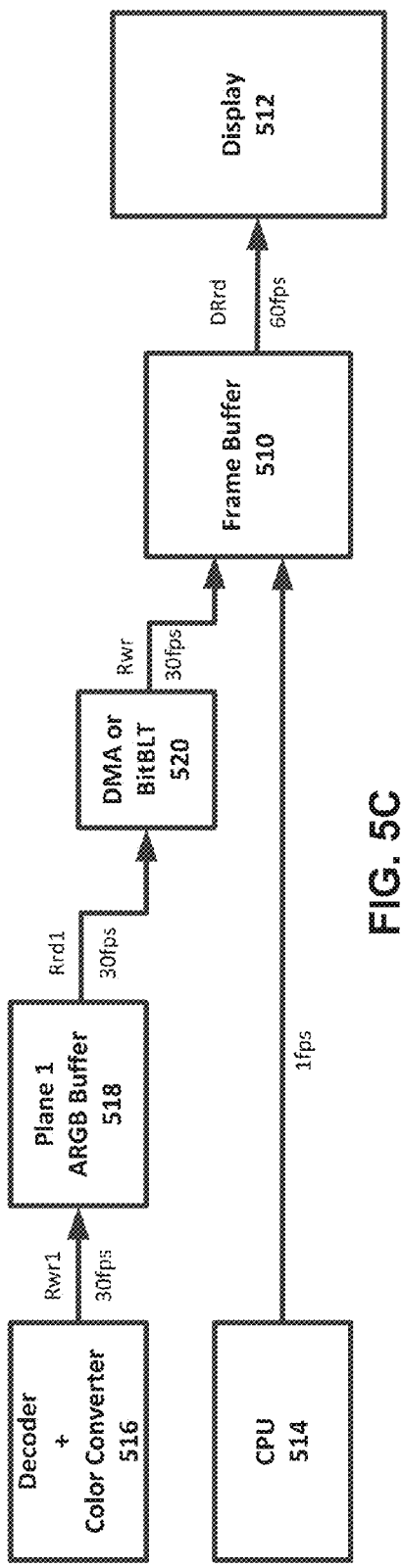
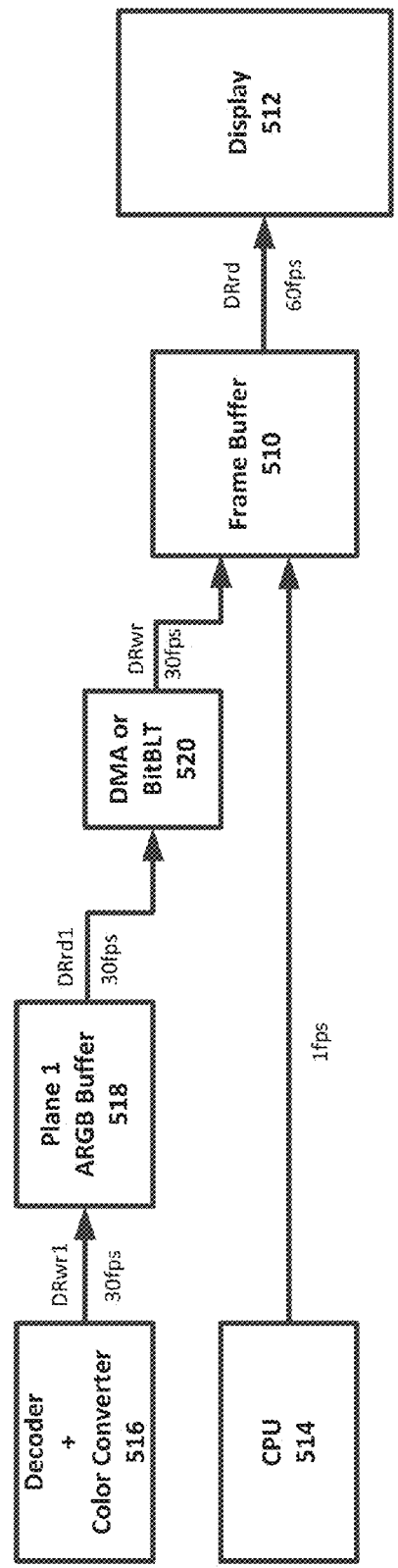
FIG. 5C
FIG. 5D

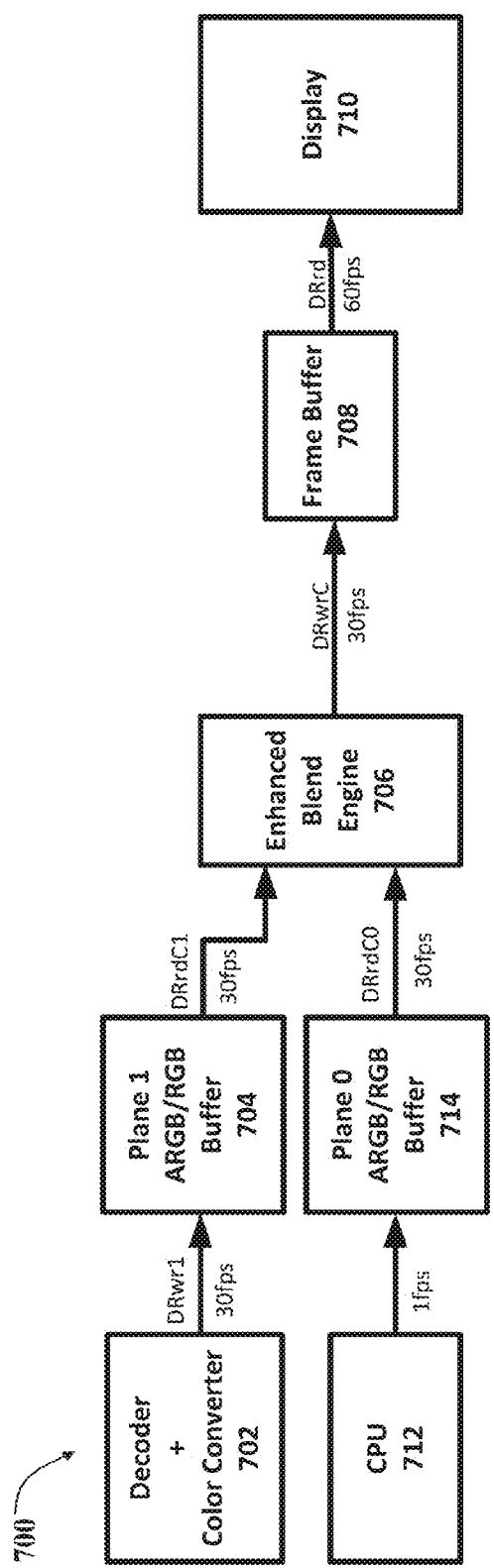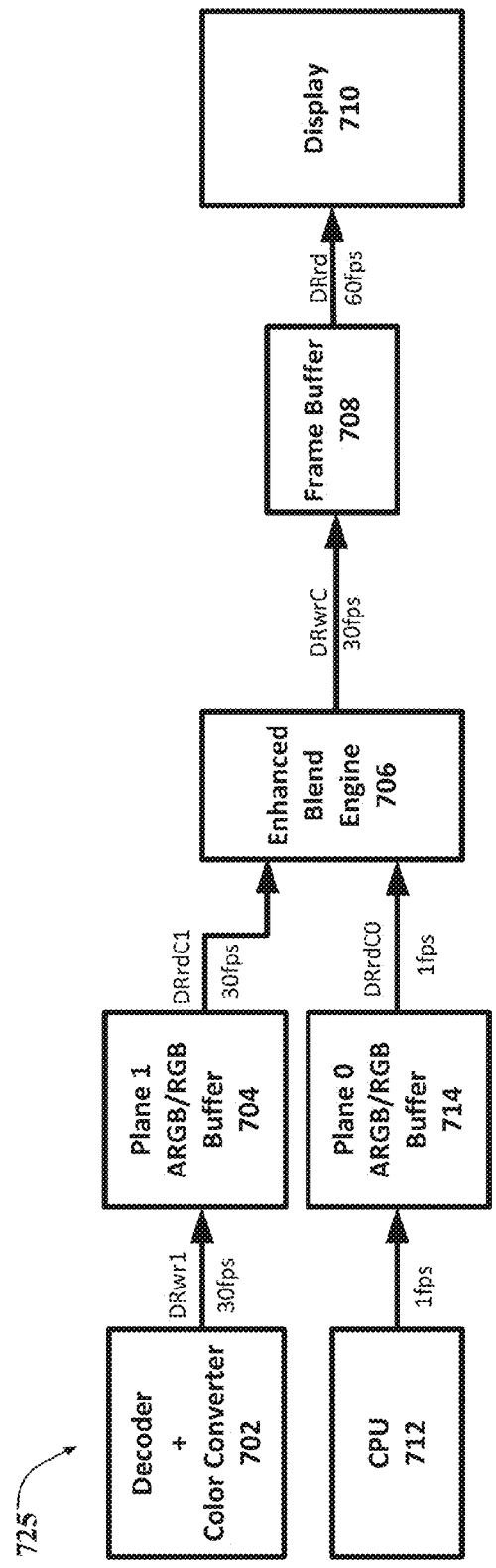

SYSTEMS AND METHODS FOR COMPOSITING A DISPLAY IMAGE FROM DISPLAY PLANES USING ENHANCED BLENDING HARDWARE

RELATED APPLICATION

The present application is a continuation-in-part of and claims the benefit of priority to U.S. application Ser. No. 14/080,918 entitled "Systems and Methods for Compositing a Display Image from Display Planes Using Enhanced Bit-Level Block Transfer Hardware," which was filed on Nov. 15, 2013 and which is hereby incorporated by reference in its entirety.

TECHNICAL FIELD

Aspects of the present disclosure relate to the field of digital video and graphics processing. In particular, but not by way of limitation, example embodiments of the present disclosure concern techniques for compositing a display image from display planes using enhanced blending hardware.

BACKGROUND

Full-motion video generation systems decode and display full-motion video. In a computer context, full-motion video is the rendering of clips of television programming or film on a computer screen for the user. (This document will use the term 'full-motion video' when referring to such television or film clips to distinguish such full-motion video from the reading of normal desktop graphics for generation of a video signal for display on a video display monitor.) Full-motion video is generally represented in digital form as computer files containing encoded video or an encoded digital video stream received from an external source. To display such full-motion video, the computer system must decode the full-motion video and then merge the full-motion video with video data in the computer system's main frame buffer. Thus, the generation of full-motion video is a memory size and memory bandwidth-intensive task. However, the display of full-motion video is a standard feature that is now expected in all modern computer systems.

In a full personal computer (PC) system, there is ample central processing unit (CPU) processing power, memory, and memory bandwidth in order to perform all of the needed functions for rendering a complex composite video display signal. For example, the CPU may decode a full-motion video stream, render a desktop display screen in a frame buffer, and a video display adapter may then read the decoded full-motion video, combine the decoded full-motion video with the desktop display screen, and render a composite video display signal.

However, in small computer systems, where the computing resources are much more limited, the task of generating a video display can be much more difficult. For example, mobile telephones, handheld computer systems, netbooks, and terminal systems will have much less CPU, memory, and video display adapter resources than a typical PC system. Thus, the task of rendering a composite video display can be very difficult in a small computer. It would therefore be desirable to develop methods of improving the display systems for small computer systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 5A-5D illustrate block diagrams of example systems for image composition based on two display planes, according to some embodiments.

FIGS. 7A-7D illustrate block diagrams of example systems for processing display data sent from a server to a client device using an enhanced blending engine utilizing matrices to composite an image, according to some embodiments.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the inventive subject matter disclosed herein. It will be apparent to one skilled in the art that specific details in the example embodiments are not required in order to practice the present inventive subject matter. For example, although an example embodiment is described with reference to thin-client terminal systems, the teachings of this disclosure may be used in any computer system with a digital display. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
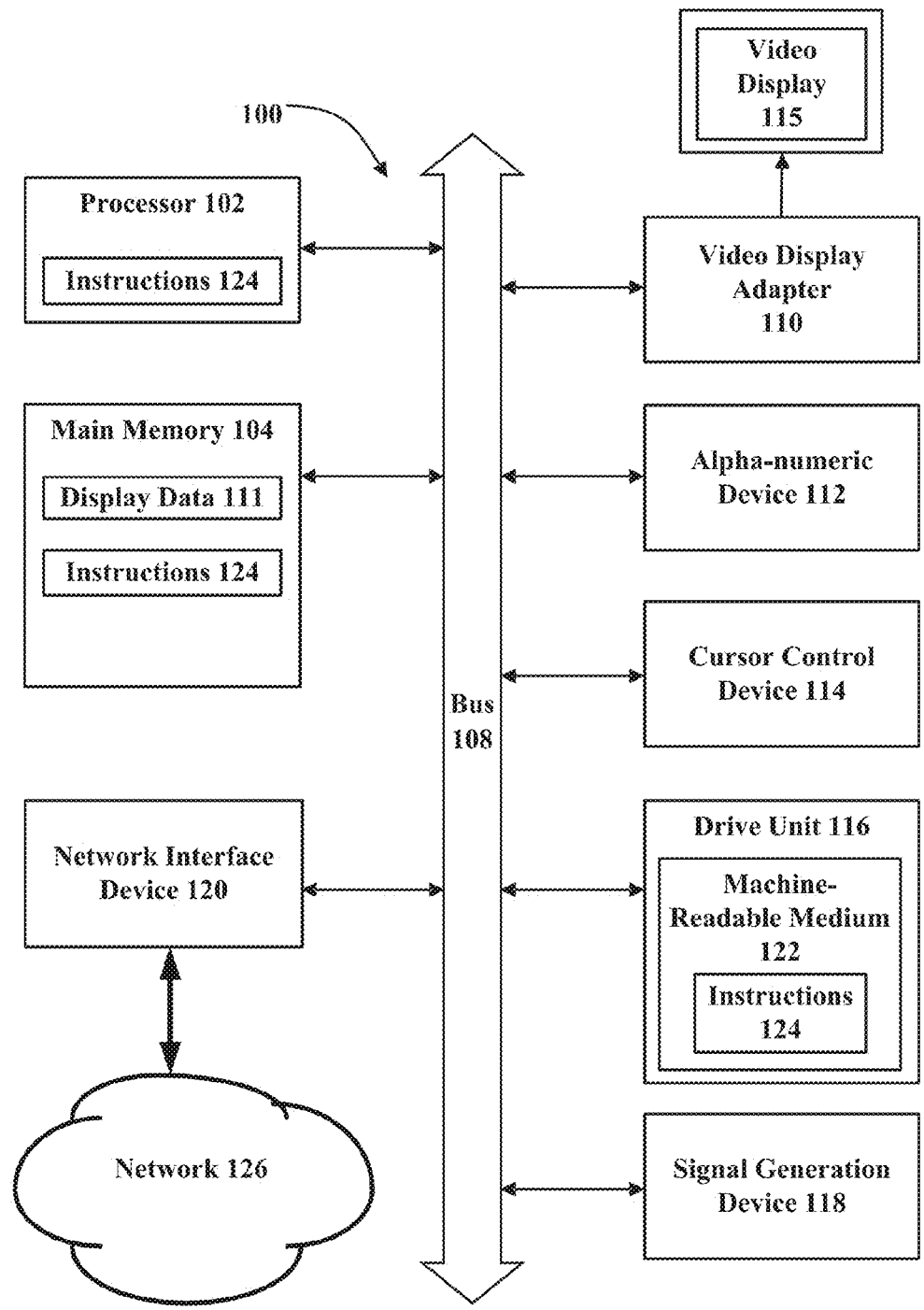
FIG. 1 illustrates a diagrammatic representation of a machine in the example form of a computer system within which a set of instructions, for causing the machine to perform any one or more of the methodologies discussed herein, may be executed.

The present disclosure concerns computer systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a PC, a tablet PC, a set-top box (STB), a personal digital assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a CPU, a graphics processing unit (GPU) or both), and a main memory 104 that communicate with each other via a bus 108. The computer system 100 may further include a video display adapter 110 that drives a video display system 115 such as a liquid crystal display (LCD) or a cathode ray tube (CRT). The computer system 100 also includes an alpha-numeric input device 112 (e.g., a keyboard), a cursor control device 114 (e.g., a mouse or trackball), a disk drive unit 116, a signal generation device 118 (e.g., a speaker), and a network interface device 120.

In many computer systems, a section of the main memory 104 is used to store display data 111 that will be accessed by the video display adapter 110 to generate a video signal. A section of memory that contains a digital representation of what the video display adapter 110 is currently outputting on the video display system 115 is generally referred to as a frame buffer. Some video display adapters store display data in a dedicated frame buffer located separate from the main memory. (For example, a frame buffer may reside within the video display adapter 110.) However, this application will primarily focus on computer systems that store a frame buffer in a shared memory system.

The disk drive unit 116 includes a machine-readable medium 122 on which is stored one or more sets of computer instructions and data structures (e.g., instructions 124, also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

Some computer systems may operate in a terminal mode wherein the system receives a full representation of display data to be stored in the frame buffer over the network interface device 120. Such computer systems will decode the display data and fill the frame buffer with the decoded display data. The video display adapter 110 will then render the received data on the video display system 115. In addition, a computer system may receive a stream of full-motion video (FMV) for display. The computer system decodes the FMV stream data such that the FMV can be displayed The video display adapter 110 then merges that FMV data with display data in the frame buffer to generate a final display signal for the video display system 115.

In FIG. 1, although the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions 124. The term "machine-readable medium" shall also be taken to include any medium that is capable of storing, encoding, or carrying a set of instructions for execution by the machine and that cause the machine to perform any one or more of the methodologies described herein, or that is capable of storing, encoding, or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Computer Display Systems

A video display for a computer system is made up of a matrix of individual pixels (picture elements). Each pixel is the individual "dot" on the video display device. The resolution of a video display device is defined as the number of pixels displayed on the video display device. For example, a video display monitor with a resolution of 800×600 will display a total of 480,000 pixels. Most modern computer systems can render video in several different display resolutions such that the computer system can take advantage of the specific resolution capabilities of the particular video display monitor coupled to the computer system.

In a computer system with a color display system, each individual pixel can be any different color that can be generated by the display system. Each individual pixel is represented in the frame buffer of the memory system with a digital value that specifies the pixel's color. The number of different colors that may be represented is limited by the number of bits assigned to each pixel. The number of bits per pixel is often referred to as the color-depth.

A single bit per pixel frame buffer would only be capable of representing black and white. A monochrome display would require a small number of bits to represent various shades of gray. A "High Color" display system is defined as each pixel containing 16 bits of color data where there is with 5 bits of red data, 6 bits of green data, and 5 bits of blue data. "True Color" is defined as each pixel containing 24 bits of data, with 8 bits of Red data, Green data, Blue data (RGB) each. Thus, True Color mode is synonymous with "24-bit" mode and High Color is "16-bit" mode. Due to reduced memory prices and the ability of 24-bit (True Color) to convincingly display any image without much noticeable degradation, most computer systems now use 24 bit "True Color" color. Some video systems may also use more than 24 bits per pixel wherein the extra bits are used to denote levels of transparency such that multiple depths of pixels may be combined.

To display an image on a video display system, the video display adapter of a computer system fetches pixel data from the frame buffer, interprets the color data, and then generates an appropriate display signal that is sent to a display device such as a LCD panel. Only a single frame buffer is required to render a video display. However, more than one frame buffer may be present in a computer system memory depending on the application.

In a PC system, the video adapter system may have a separate video frame buffer that is in a dedicated video memory system. The video memory system may be designed specifically for handling the task of display data. Thus, the rendering of a video display can be handled easily in most PCs. However, in small computer systems such as mobile telephones, handheld computer systems, netbooks, and terminal systems, the computing resources tend to be much more limited. The computing resources may be limited due to cost, battery usage, heat dissipation, and other reasons. Thus, the task of generating a video display in a small computer system can be much more difficult. For example, a small computer system will generally have less CPU power, memory, and video display adapter resources than a PC system.

In a small computer system, there is often no separate video memory system. Thus, the video generation system must share the same memory as the rest of the small computer system. Since a video generation system must constantly read the entire frame buffer at high rate (generally 30 to 60 times per second), the memory bandwidth (the amount of data that can be read out of the memory system per unit time) can become a very scarce resource that limits functionality of the small computer system. Thus, it is important to devise methods of reducing the memory bandwidth requirements of applications within a small computer system.

Thin-Client Terminal System Overview

As set forth above, many different types of computer systems with limited resources may benefit from methods that reduce the memory bandwidth requirements. The present application will focus on an implementation within a small computer terminal system known as a thin-client terminal system. A thin-client terminal system is an inexpensive small computer system that is only designed to receive user input, transmit that input to a remote computer system, receive output information from that remote computer system, and present that output information to the user. For example, a thin-client terminal system may transmit mouse movements and keystrokes received from a user to a remote computer system and display video output data received from the remote computer system. No user application programs execute on the processor of a dedicated thin-client terminal system.

Modern thin-client terminal systems strive to provide all of the standard interface features that PCs provide to their users. For example, modern thin-client terminal systems include the high-resolution graphics capabilities, audio output, and cursor control (mouse, trackpad, trackball, etc.) input that PC users have become accustomed to using. To implement all of these features, modern thin-client terminal systems have small dedicated computer systems that implement all of the tasks such as decoding and rendering the video display and encoding the user inputs for transmission to the remote computer system.

Note that although the techniques set forth this document will be disclosed with reference to thin-client terminal systems, the techniques described herein are applicable in any other type of small computer system that needs to efficiently use limited computer resources. For example, any other small computer system that renders FMV, such as mobile telephones, netbooks, slate computers, or other small systems, may use the teachings of this document.

An Example Thin-Client System

Figure 2A:
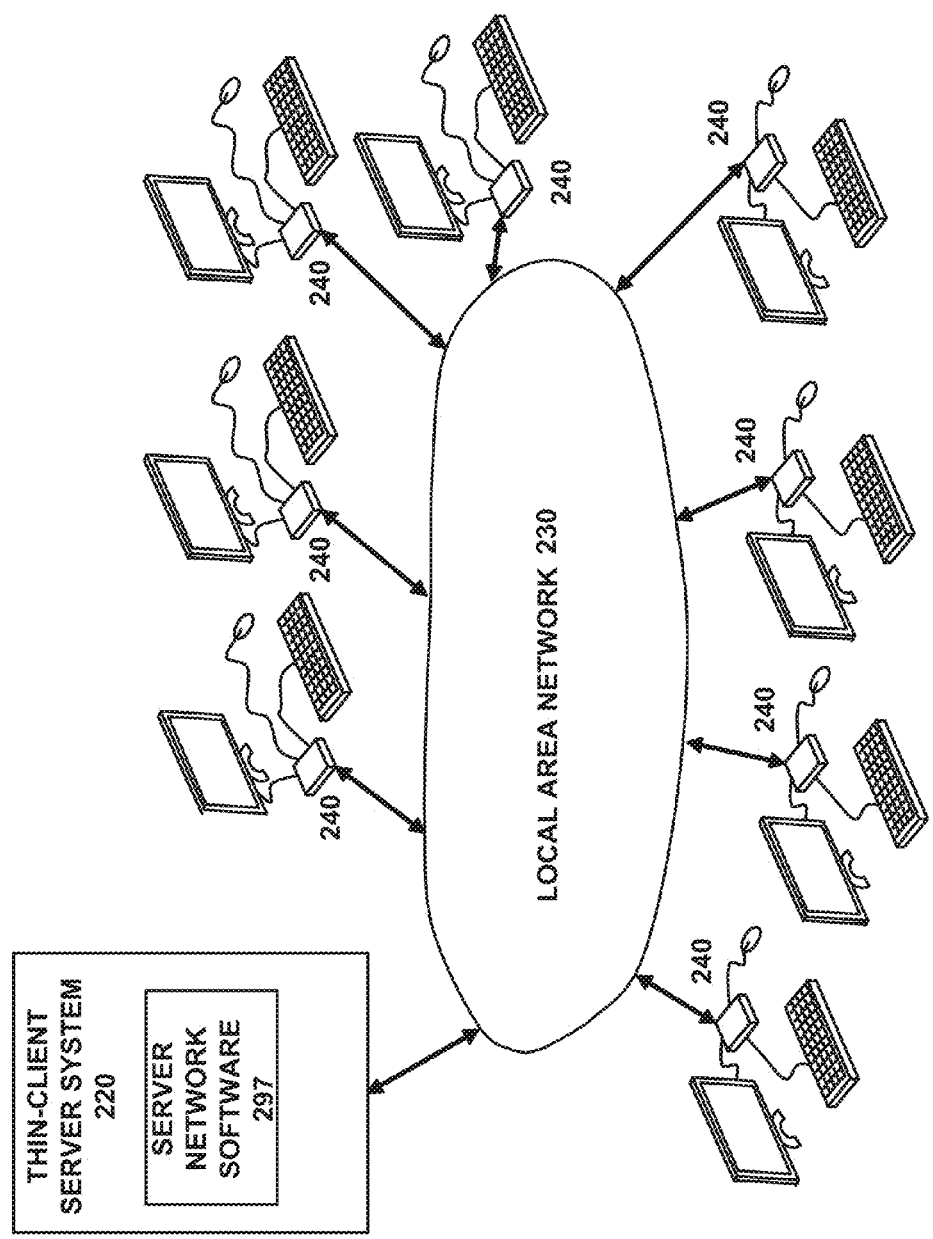
FIG. 2A illustrates a high-level block diagram of an example single thin-client server computer system supporting multiple individual thin-client terminal systems using a local area network, according to some embodiments.

FIG. 2A illustrates a conceptual diagram of a thin-client environment. Referring to FIG. 2A, a single thin-client server computer system 220 provides computer processing resources to many individual thin-client terminal systems 240. Computer applications execute on the server computer system 220, and the thin-client terminal systems 240 are used for displaying output and receiving user input.

In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server computer system 220, and the thin-client server computer system 220 transmits output information (such as video and audio) across the local area network 230 to the individual thin-client terminal systems 240. The individual thin-client terminal systems 240 are served using thin-client server network software 297 running on thin-client server computer system 220.

Figure 2B:
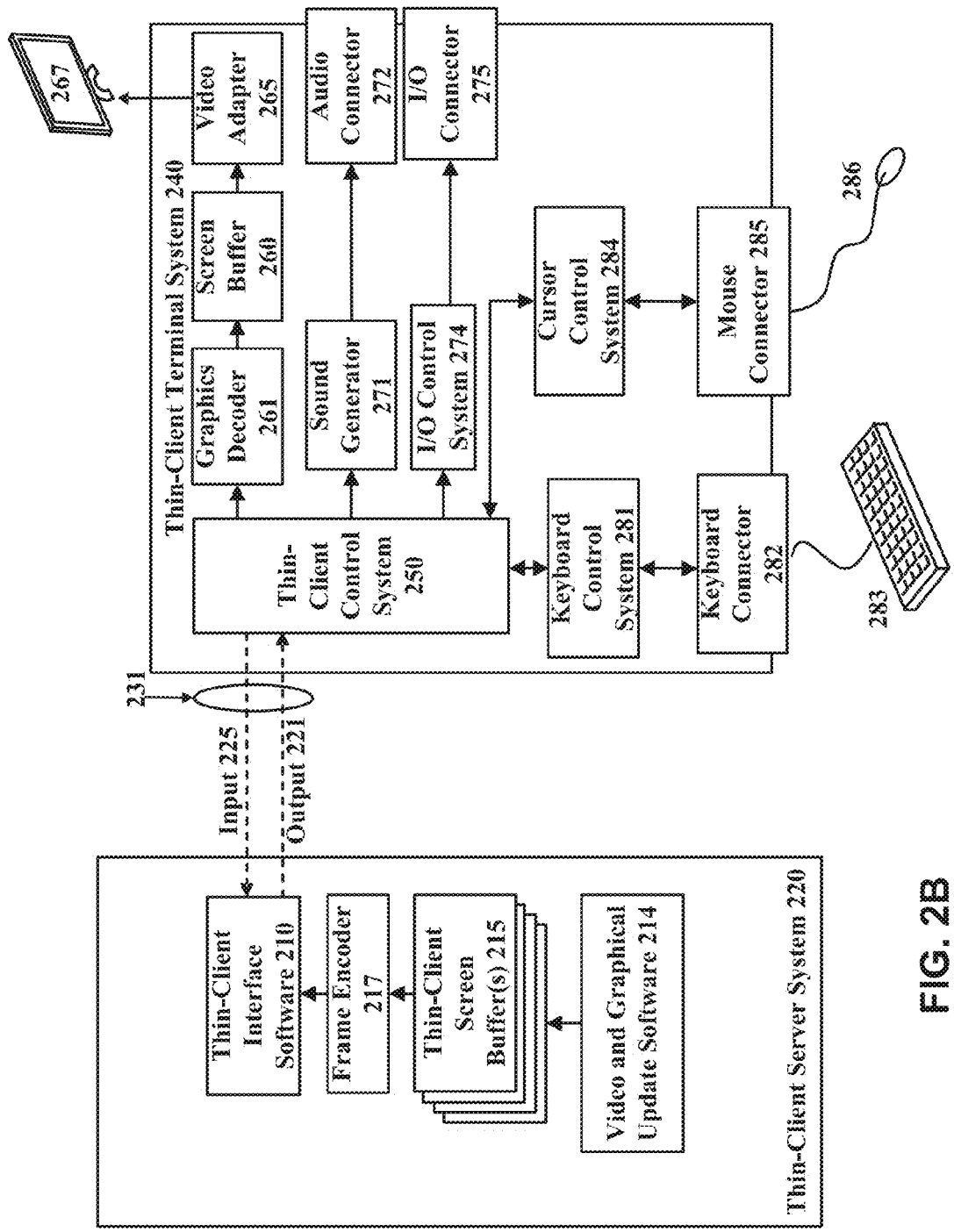
FIG. 2B illustrates a block diagram of an example thin-client terminal system coupled to a thin-client server computer system, according to some embodiments.

FIG. 2B illustrates a block diagram of a basic embodiment of a thin-client server computer system 220 coupled to one (of possibly many) thin-client terminal system 240. The thin-client server computer system 220 and thin-client terminal system 240 are coupled with a bi-directional digital communications channel 231 that may be a serial data connection, an Ethernet connection, or any other suitable bi-directional digital communication means such as the local area network 230 of FIG. 2A.

The goal of thin-client terminal system 240 is to provide most or all of the standard input and output features of a PC system to the user of the thin-client terminal system 240. However, this goal should be achieved at the lowest possible cost since if a thin-client terminal system 240 is too expensive, a PC system could be purchased instead of the inexpensive thin-client terminal system 240. Keeping the costs low can be achieved since the thin-client terminal system 240 will not need the full computing resources or software of a PC system. Those features will be provided by the thin-client server computer system 220 that will interact with the thin-client terminal system 240.

Referring back to FIG. 2B, the thin-client terminal system 240 provides both visual and auditory output using a high-resolution video display system and an audio output system. The high-resolution video display system consists of a graphics update decoder 261, a frame buffer or a screen buffer 260, and a video adapter 265. When changes are made to a representation of a terminal's display in thin-client screen buffer 215 within the server computer system 220, a frame encoder 217 identifies those changes in the thin-client screen buffer 215, encodes the changes, and then transmits the changes to the thin-client terminal system 240. In an example embodiment, the frame encoder 217 may be a Joint Photographic Experts Group ("JPEG") encoder.

Within the thin-client terminal system 240, the graphics update decoder 261 decodes graphical changes made to the associated thin-client screen buffer 215 in the server computer system 220 and applies those same changes to the local screen buffer 260, thus making screen buffer 260 an identical copy of the bit-mapped display information in thin-client screen buffer 215. Video adapter 265 reads the video display information out of screen buffer 260 and generates a video display signal to drive display system 267.

The audio sound system of thin-client terminal system 240 operates in a similar manner. The audio system consists of a sound generator 271 for creating a sound signal coupled to an audio connector 272. The sound generator 271 is supplied with audio information from thin-client control system 250 using audio information sent as output 221 by the thin-client server computer system 220 across bi-directional communications channel 230.

From an input perspective, thin-client terminal system 240 allows a terminal system user to enter both alphanumeric (keyboard) input and cursor control device (mouse) input that will be transmitted to the thin-client server computer system 220. The alpha-numeric input is provided by a keyboard 283 coupled to a keyboard connector 282 that supplies signals to a keyboard control system 281. The thin-client control system 250 encodes keyboard input from the keyboard control system 281 and sends that keyboard input as input 225 to the thin-client server computer system 220. Similarly, the thin-client control system 250 encodes cursor control device input from cursor control system 284 and sends that cursor control input as input 225 to the thin-client server computer system 220. The cursor control input is received through a mouse connector 285 from a computer mouse 286 or any other suitable cursor control device such as a trackball, trackpad, and the like. The keyboard connector 282 and mouse connector 285 may be implemented with a PS/2 type of interface, a Universal Serial Bus (USB) interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2B includes input/output control system 274 coupled to input/output connector 275. Input/output control system 274 may be a USB controller, and input/output connector 275 may be a USB connector in order to provide USB capabilities to the user of thin-client terminal system 240.

Thin-client server computer system 220 is equipped with multi-tasking software for interacting with multiple thin-client terminal systems 240. As illustrated in FIG. 2B, thin-client interface software 210 in thin-client server computer system 220 supports the thin-client terminal system 240 as well as any other thin-client terminal systems coupled to thin-client server computer system 220. The thin-client server computer system 220 keeps track of the state of each thin-client terminal system 240 by maintaining a thin-client screen buffer 215 in the thin-client server computer system 220 for each thin-client terminal system 240. The thin-client screen buffer 215 in the thin-client server computer system 220 contains a representation of what is displayed on the associated thin-client terminal system 240.

To display FMV or graphics on the thin-client screen buffer 215, video and graphical update software 214 on the thin-client server system 220 may access FMV data and/or graphics data and then render the video frames and/or graphics image into the thin-client screen buffer 215 associated with the thin-client terminal system 240 that requested the FMV and/or graphics.

Transporting Video Information to Terminal Systems

The bandwidth required to transmit an entire high-resolution video frame buffer from a server to a terminal at full refresh speeds is prohibitively large. Thus video compression systems are used to greatly reduce the amount of information needed to recreate a video display on a terminal system at a remote location. In an environment that uses a shared communication channel to transport the video display information (such as the computer network based thin-client environment of FIG. 2B), large amounts of display information transmitted to each thin-client terminal system 240 can adversely impact the local area network 230. If the video display information is not encoded efficiently enough, the large amount of display information may overwhelm the network 230 thus not allowing the system to function at all.

When the applications running on the thin-client server computer system 220 are typical office software applications (such as word processors, databases, spreadsheets, etc.), some simple techniques can be used to significantly decrease the amount of display information that is to be delivered over the network 230 to the thin-client terminal systems 240 while maintaining a quality user experience for each terminal system user. For example, the thin-client server computer system 220 may only send display information across the network 230 to a thin-client terminal system 240 when the display information in the thin-client screen buffer 215 for that specific thin-client terminal system 240 actually changes. In this manner, when the display for a thin-client terminal system is static (e.g., no changes are being made to the thin-client screen buffer 215 in the thin-client server computer system 220), then no display information needs to be transmitted from the thin-client server computer system 220 to the thin-client terminal system 240. Small changes (such as a few words being added to a document in a word processor or the pointer being moved around the screen) will only require small updates to be transmitted.

As long as the software applications run by the users of thin-client terminal systems 240 do not change the display screen information very frequently, then the thin-client system illustrated in FIGS. 2A and 2B will work adequately. However, if some thin-client terminal system users run software applications that rapidly change the thin-client terminal's display screen (such as viewing FMV), the volume of network traffic over the network 230 will increase greatly due to the much larger amounts of graphical update messages that must be transmitted. If several thin-client terminal system 240 users run applications that display FMV, then the bandwidth requirements for the communication channel 230 can become quite formidable such that data packets may be dropped. Dropped packets will greatly decrease the user experience.

To create a more efficient system for handling FMV in a thin-client environment, an improved full-motion system was disclosed in the related United States patent application titled "System And Method For Low Bandwidth Display Information Transport" having Ser. No. 12/395,152, filed Feb. 27, 2009, which is hereby incorporated by reference in its entirety. That disclosed system transmits FMV information to be displayed on a thin-client terminal system in an efficiently compressed format. The thin-client terminal system then decodes the compressed FMV to display the FMV locally. An example of this efficient system for transmitting FMV is illustrated in FIG. 3.

Figure 3:
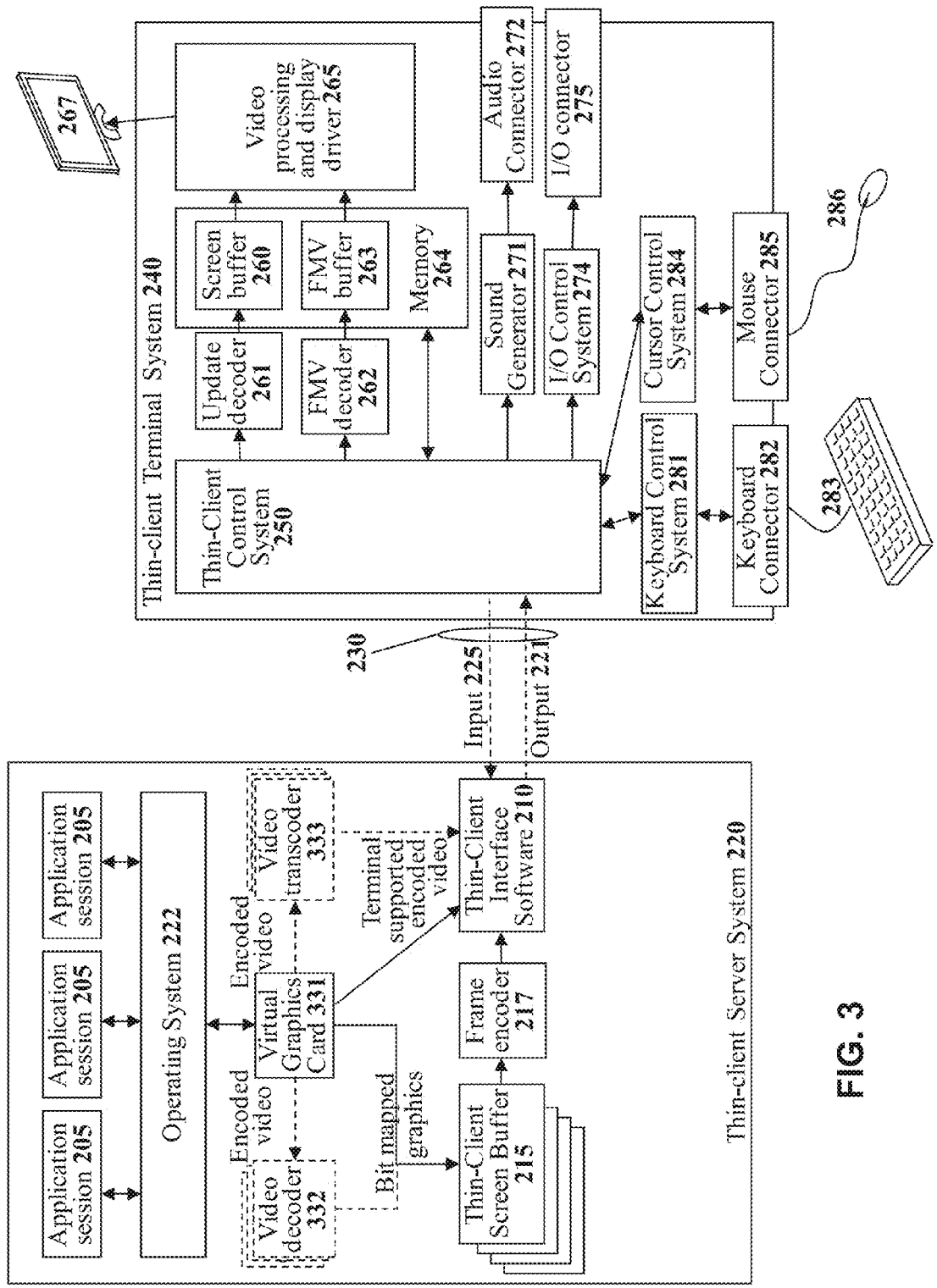
FIG. 3 illustrates a block diagram of an example thin-client server computer system and thin-client terminal system that support a higher quality video stream decoded locally within the thin-client terminal system, according to some embodiments.

Referring to FIG. 3, a thin-client server computer system 220 and a thin-client terminal system 240 are displayed. The thin-client terminal system 240 of FIG. 3 is similar to the thin-client terminal system 240 of FIG. 2B with the addition of a FMV decoder 262. The FMV decoder 262 may receive a FMV stream from thin-client control system 250, decode the FMV stream, and render the decoded video frames in a FMV buffer 263 in a shared memory system 264. The shared memory system 264 may be used for many different memory tasks within thin-client terminal system 240. In the example of FIG. 3, the shared memory system 264 is used to store information for a display screen buffer 260, a decoded FMV buffer 263, and other digital information from the thin-client control system 250.

The FMV decoder 262 may be implemented with software running on a processor, as a discrete off-the-shelf hardware part, as a digital circuit implemented with an Application Specific Integrated Circuit (ASIC), as a Field Programmable Gate Array (FPGA), or in any other suitable method. In one embodiment, the FMV decoder 262 is implemented as a part of an ASIC since several other portions of the thin-client terminal system 240 could also be implemented within the same ASIC device.

The video transmission system in the thin-client server computer system 220 of FIG. 3 must also be modified in order to transmit encoded FMV streams directly to the thin-client terminal system 240. Referring to the thin-client server computer system 220 of FIG. 3, the video system may include a virtual graphics card 331, thin-client screen buffers 215, and frame encoder 217. Note that FIG. 3 illustrates other elements that may also be included such as FMV decoders 332 and FMV transcoders 333. For more information on those elements, the reader should refer to the related US patent application titled "System And Method For Low Bandwidth Display Information Transport" having Ser. No. 12/395,152, filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 that is supported by the thin-client server computer system 220. The goal of the virtual graphics card 331 is to output either bit-mapped graphics to be placed into the appropriate thin-client screen buffer 215 for a thin-client terminal system 240 or to output an encoded FMV stream that is supported by the FMV decoder 262 within the thin-client terminal system 240.

The FMV decoders 332 and FMV transcoders 333 within the thin-client server computer system 220 may be used to support the virtual graphics card 331 in handling FMV streams. Specifically, the FMV decoders 332 and FMV transcoders 333 help the virtual graphics card 331 handle encoded FMV streams that are not natively supported by the FMV decoder 262 in thin-client terminal system 240. The FMV decoders 332 are used to decode FMV streams and place the video data thin-client screen buffer 215 (in the same manner as the system of FIG. 2B). The FMV transcoders 333 are used to convert from a first digital FMV encoding format into a second digital FMV encoding format that is natively supported by FMV decoder 262 in the target thin-client terminal system 240.

The FMV transcoders 333 may be implemented as the combination of a digital FMV decoder for decoding a first digital video stream into individual decoded video frames, a frame buffer memory space for storing decoded video frames, and a digital FMV encoder for re-encoding the decoded video frames into a second digital FMV format supported by the target thin-client terminal system 240. This enables the transcoders 333 to use existing FMV decoders on the PC system. Furthermore, the transcoders 333 could share the same FMV decoding software used to implement FMV decoders 332. Sharing code would reduce licensing fees.

The final output of the video system in the thin-client server computer system 220 of FIG. 2B is either graphics update messages from the frame encoder 217 or an encoded FMV stream that is supported by the target thin-client terminal system 240. The thin-client interface software 210 outputs the graphics update messages and FMV stream information across communication channel 230 to the target thin-client terminal system 240.

In the thin-client terminal system 240, the thin-client control system 250 will distribute the incoming output information (such as audio information, frame buffer graphics, and FMV streams) to the appropriate subsystem within the thin-client terminal system 240. Thus, graphical frame buffer update messages will be passed to the graphics update decoder 261, and the streaming FMV information will be passed to the FMV decoder 262. The graphics update decoder 261 decodes the graphical frame buffer update messages and then applies the graphics update to the thin-client terminal's screen buffer 260. Similarly, the FMV decoder 262 will decode the incoming digital FMV stream and write the decoded video frames into the FMV buffer 263. As illustrated in FIG. 3, the terminal's screen buffer 260 and the FMV buffer 263 reside in the same shared memory system 264. The video processing and video adapter 265 then reads all of the display information out of the terminal's screen buffer 260 and combines it with FMV information read from the FMV buffer 263 to render a final output display signal for display system 267. Thus, to handle the display of video output, the shared memory system 264 must receive updates from the graphics update decoder 261, receives decoded video frames from the FMV decoder 262, and outputs both frame buffer and FMV frames to the video processing and video adapter 265. In addition, the shared memory system 264 must support other memory users such as a network interface and user interface.

Figure 4A:
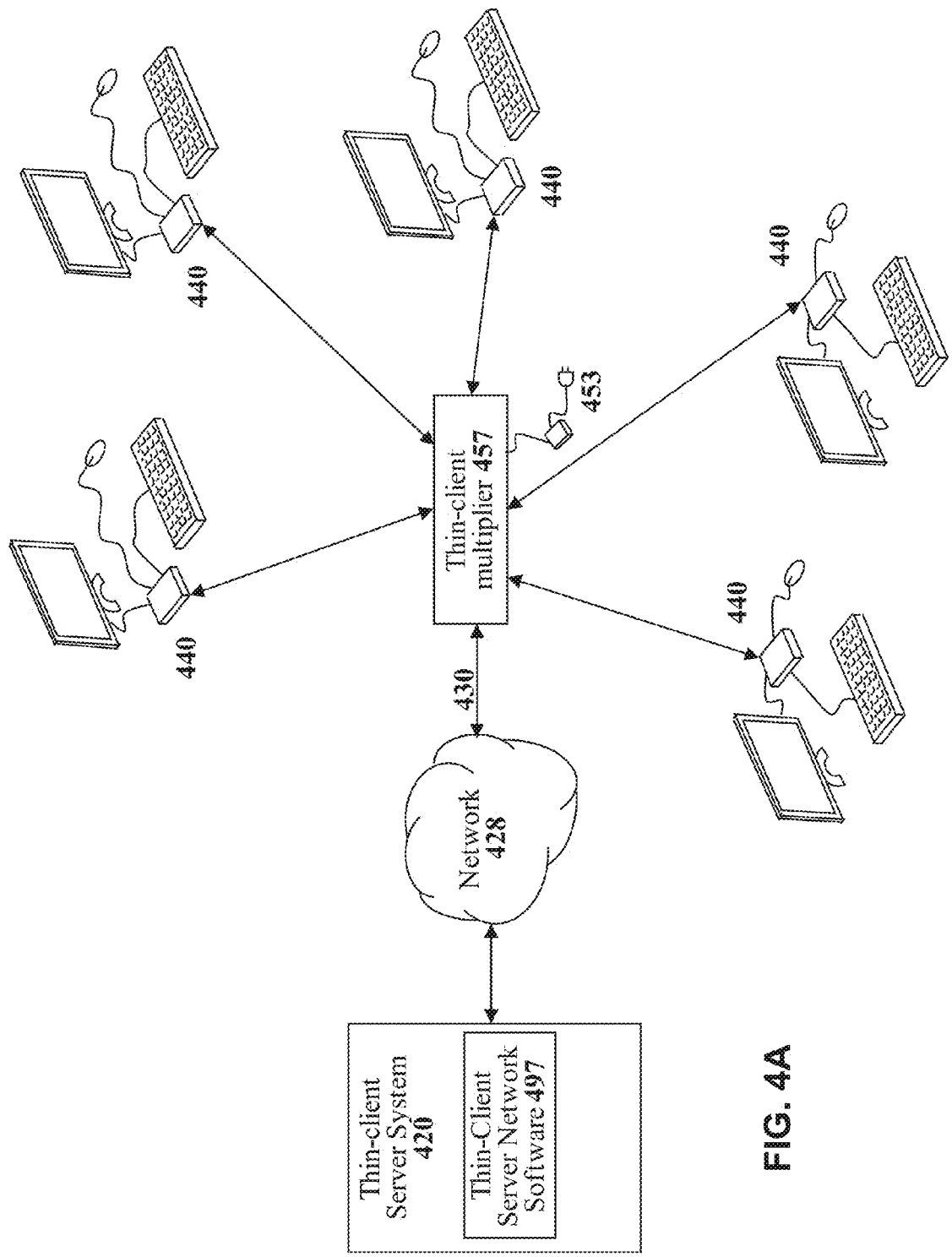
FIG. 4A illustrates a block diagram of three example thin-client terminal systems coupled to a thin-client server system using a thin-client multiplier device, according to some embodiments.

In a system that supports multiple users, the memory bandwidth probably will become even more acute. FIG. 4A illustrates a thin-client terminal environment wherein a thin-client server system 420 is coupled through a network 428 to a thin-client multiplier 457 that serves five different thin-client terminal systems 440 using thin-client server network software 497. In one embodiment, the thin-client multiplier 457 is a small computer system constructed with an ASIC that outputs video signals for the three different thin-client terminal systems 440 using a shared memory system.

Figure 4B:
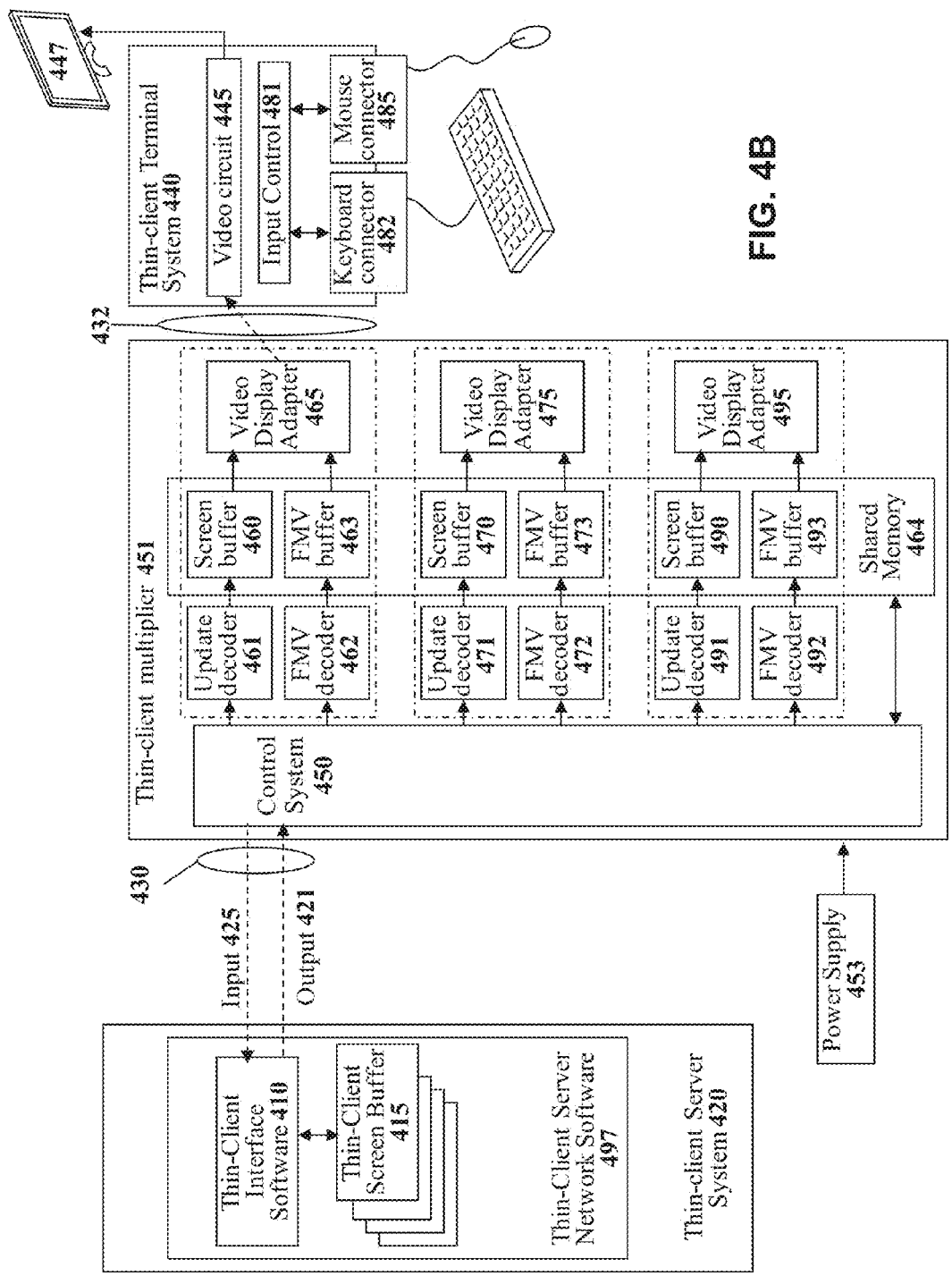
FIG. 4B illustrates a block diagram of an example thin-client multiplier device that may support up to three thin-client terminal systems, according to some embodiments.

FIG. 4B illustrates a block diagram of the video display circuitry for a thin-client multiplier 451 that serves three different thin-client terminal systems 440 using a single shared memory system 464. (Note that for clarity, FIG. 4B only displays one of the three thin-client terminal systems 440 and does not display circuitry for handling terminal input data.) The single shared memory system 464 in the thin-client multiplier 451 handles all the incoming video display data for three screen buffers (460, 470, and 490) and three FMV buffers (463, 473, and 493). Similarly, there are three video display adapters (465, 475, and 495) for reading display data out the screen buffers (460, 470, and 490) and FMV buffers (463, 473, and 493) in order to generate video output signals to drive associated thin-client terminal systems 440. All of this video display activity will greatly stress the memory bandwidth limitations of the shared memory system 464.

Compositing a Display Image Using Display Planes

In the thin-client environments of FIGS. 2A, 2B, and 3, the thin-client server computer system 220 may transmit graphics data to the thin-client terminal system 240 over a network. In the network-controlled thin-client terminal system 240, network bandwidth is typically under scrutiny. For example, display resolution is generally on the rise with higher-resolution monitors providing crisper images and more data on the screen, which may require more bandwidth from the network. To reduce the network bandwidth required by these higher-resolution monitors, newer display data transfer protocols have been deployed. In response to these new protocols, client-side technology may be adjusted. However, data decompression techniques on the thin-client terminal system 240 may demand more memory bandwidth from a thin-client environment using these new protocols, which may translate to higher system costs. The techniques disclosed herein resolve these issues by providing for memory bandwidth optimization while accommodating these new network protocols.

Certain display protocols over a network may transfer display data from a server to the client in a number of ways. For example, static areas of a display screen or areas that change infrequently may be sent over the network using lossless compression techniques. Areas that change rapidly (e.g., a movie at 30 frames per second (fps)), may be sent using lossy compression algorithms to save network bandwidth, such as h.264/MPEG-4 Part 10 compression (which may also be known as Advanced Video Coding (AVC)), JPEG compression, MPEG-2 compression, and the like. For example, a 1080P progressive scan mode movie requiring 4 gigabits per second (Gbps) bandwidth from the memory during display time (e.g., 32 bit alpha-RGB (ARGB) color with 60 Hz refresh rate) can be transferred over the network with a 4 megabits per second (Mbps) bit rate (e.g., using compressed 4:2:0 YUV color scheme) without losing information that human eyes can detect. Client systems may use several techniques for the final image composition. These techniques may use two different display planes, where a display plane may be a region in the graphics memory that acts as a render target in the display adapter. A display plane may hold a post-processed image, in the proper pixel format, that is ready to be displayed by the monitor. The two different display planes used for the final image composition may include Plane 0 for lossless data in RGB format (16, 24, or 32 bits/pixel depending on color depth chosen) and Plane 1 for lossy data in either YUV 4:2:0 format or in RGB format (16, 24, 32 bits/pixel depending on color depth chosen).

Figure 5A:
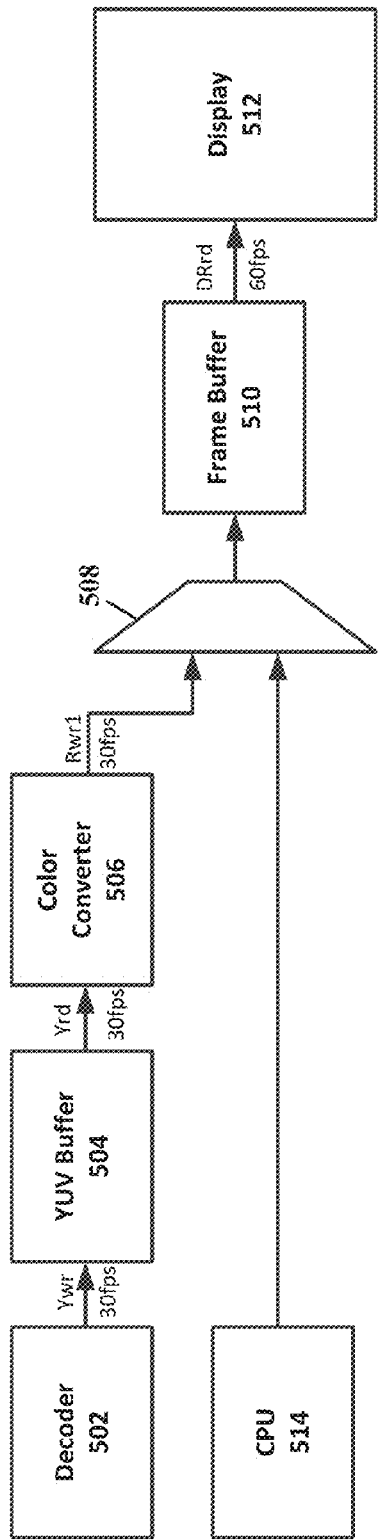
Figure 5B:
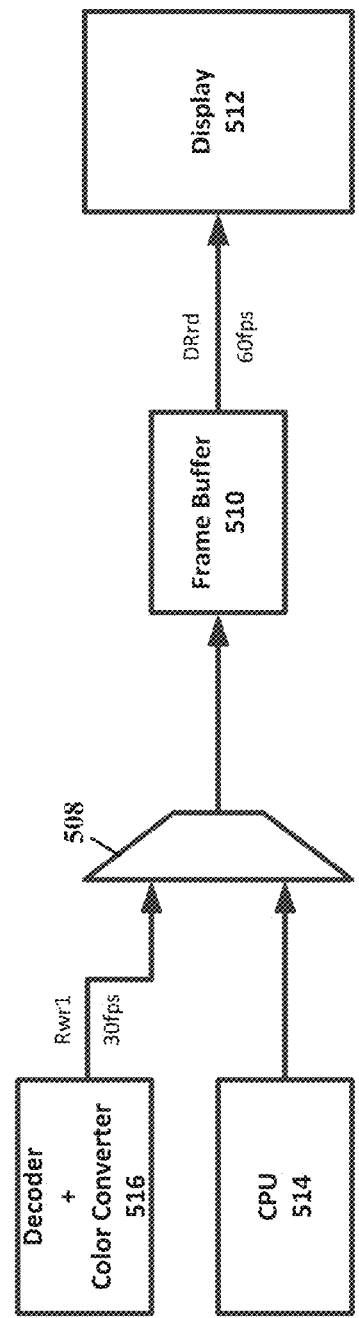

FIGS. 5A-5D illustrate block diagrams of example systems for image composition based on two display planes, as described above. Plane 0 may be written to the frame buffer whenever there is a change in a static area of the display screen. Lossy data (e.g., a window for a movie) may get written to Plane 1 when the image is ready after color conversion from 4:2:0 YUV format (1.5 bytes/pixel) to RGB format (2, 3, or 4 bytes/pixel depending on the color depth chosen). This approach may utilize a temporary buffer to hold the YUV 4:2:0 image after decompression. With the movie area known beforehand, the final image in the frame buffer may be generated by copying the dynamic image from Plane 1 to the frame buffer excluding any overlay windows (e.g., a file menu) present in Plane 0. FIG. 5A shows an example of a data path used to generate the final image in this manner. The compressed display data may be decoded by hardware decoder 502, where the decoded data may be stored in a YUV buffer 504. The color converter 506 may convert the color to the appropriate format. In some cases, the CPU 514 may also decode the data using decoding software. In these cases, the CPU 514 may replace the hardware decoder 502 in FIG. 5A. CPU 514 may be responsible for writing the lossless data. The decompressed data from the color converter 506 or the lossless data from the CPU 514, as selected by the multiplexer (MUX) 508, may be sent to the frame buffer 510, which may send the data to the display 512. FIG. 5B shows another example of a data path used to generate the final image. In FIG. 5B, a decoder and color converter component 516 may send the decompressed data, and the CPU 514 may send the lossless data, to the frame buffer 510, which may send the data to the display 512. In the example of FIG. 5B, the decoder and color converter component 516 may be used in a pipelined manner to reduce the memory bandwidth requirement further. The decoded YUV output may be color converted before writing the output to the external memory to avoid additional write and/or read memory accesses. Table 1 shows example memory bandwidths for FIGS. 5A-5D. In the example, the memory bandwidth requirement is 4.56 Gbps (e.g., FIG. 5A example) and 4.31 Gbps (FIG. 5B example) when the movie size is 720×480 pixels and the monitor size is 1920×1080 pixels.

TABLE 1

Figure 6A:
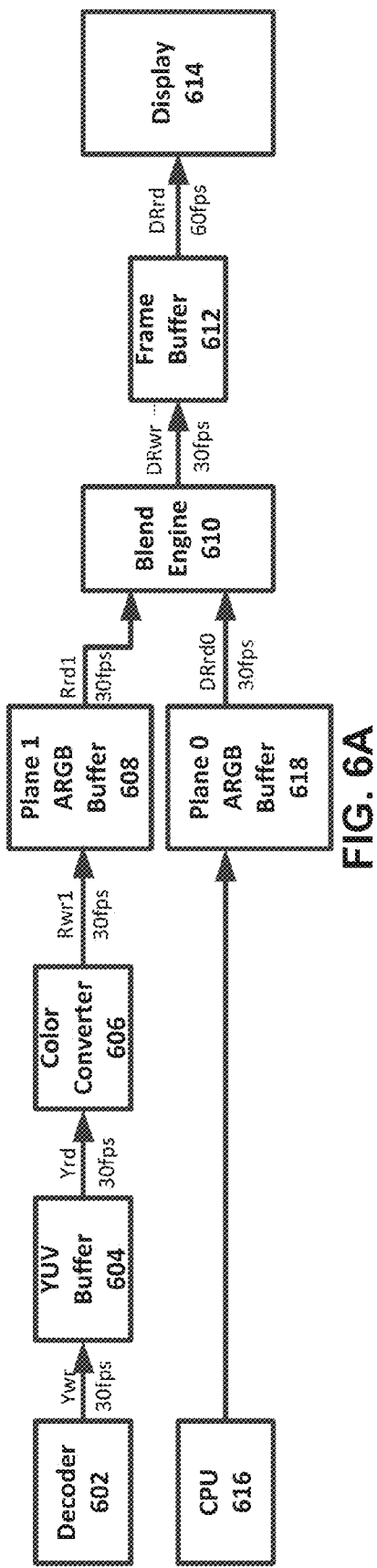
FIGS. 6A-6C illustrate block diagrams of example systems for image composition based on blending two display planes, according to some embodiments.
Figure 6B:
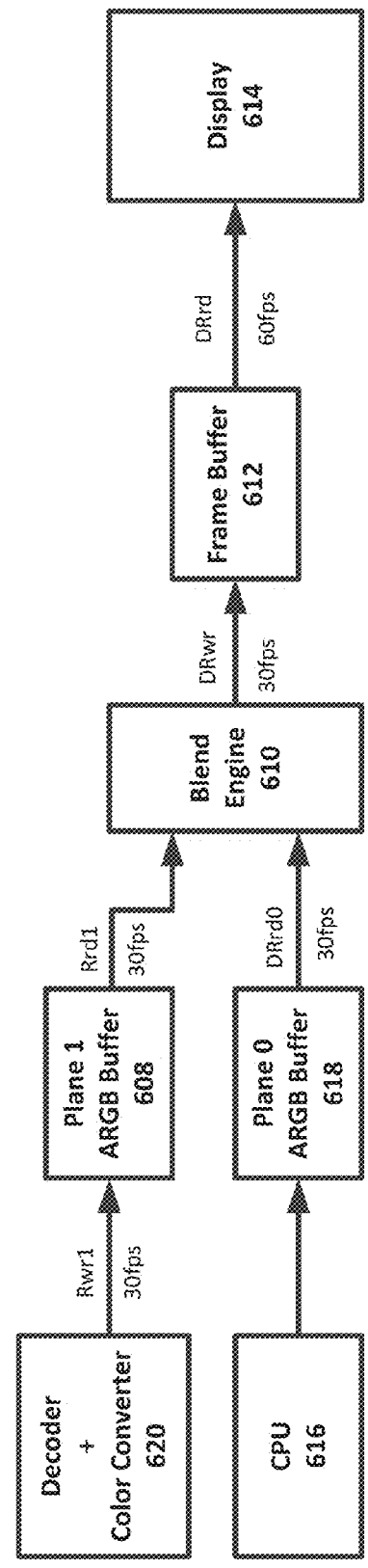

|  | Ywr - @ 30 fps (Gbps) | Yrd - @ 30 fps (Gbps) | Rwr1 - @ 30 fps (Gbps) | Rrd1 - @ 30 fps (Gbps) | Rwr - @ 30 fps (Gbps) | DRwr - @ 30 fps (Gbps) | DRrd0 - @ 30 fps (Gbps) | DRrd- @ 60 fps (Gbps) | Total Bandwidth (Gbps) |
|---|---|---|---|---|---|---|---|---|---|
| FIG. 5A | 0.12 | 0.12 | 0.33 |  |  |  |  | 3.98 | 4.56 |
| FIG. 5B |  |  | 0.33 |  |  |  |  | 3.98 | 4.31 |
| FIG. 5C |  |  | 0.33 | 0.33 | 0.33 |  |  | 3.98 | 4.98 |
| FIG. 6A | 0.12 | 0.12 | 0.33 | 0.33 |  | 1.99 | 1.99 | 3.98 | 8.88 |
| FIG. 6B |  |  | 0.33 | 0.33 |  | 1.99 | 1.99 | 3.98 | 8.63 |

TABLE 1-continued

| | When Movie size = Display size (Both at 1920 × 1080) | | | | |
|---|---|---|---|---|---|
| | DRwr1 - @ 30 fps (Gbps) | DRrd1- @ 30 fps (Gbps) | DRwr - @ 30 fps (Gbps) | DRrd - @ 60 fps (Gbps) | Total Bandwidth (Gbps) |
| FIG. 5D (32-bit ARGB) | 1.99 | 1.99 | 1.99 | 3.98 | 9.95 |
| FIG. 5D (24-bit RGB) | 1.49 | 1.49 | 1.49 | 2.99 | 7.46 |

The image composition described for FIGS. 5A-5B may be used when there are no overlay windows on the video window. To handle overlay windows, the data paths shown in FIGS. 5C-5D may be used when either a direct memory access (DMA) or bit-level block transfer (BitBLT) hardware 520 is used to pull the appropriate regions from the Plane 1 ARGB buffer 518 to compose the final picture. A DMA engine may be used to transfer the lossy image to the frame buffer 510, which may be useful when transferring a contiguous, large portion of memory. Table 1 above shows the example memory bandwidth requirement of 4.98 Gbps (e.g., FIG. 5C) when the lossy image size is 720×480 pixels and the monitor size is 1920×1080 pixels, but no overlay windows are present. FIG. 5D is similar to FIG. 5C except that FIG. 5D uses a movie size that is the same as the monitor size. Table 1 above shows the example memory bandwidth requirement of 9.95 Gbps for a case with no overlay windows when 32-bit ARGB color space is used and a bandwidth requirement of 7.46 Gpbs when 24-bit RGB color space is used. However, when there are multiple overlay windows (e.g., due to punched rectangles), a DMA engine may require CPU 514 intervention after a transfer of a fragment of memory is completed. Even if the scatter-gather option of the DMA engine is used, performance may fall short of the bandwidth requirement depending on the number and width of the rectangles. In some embodiments, every line of an image may be broken up to individual descriptors based on the widths of the lossless rectangles covering that region. As a result, hundreds of these rectangles can turn into thousands of descriptors adding more bandwidth requirement for the descriptor fetch process. Descriptor set-up, interrupt processing, and the like may add to performance loss. Additionally, a general purpose DMA engine may not be capable of data masking required during transfer (e.g., fetching from an odd pixel boundary on a 64-bit internal bus structure) and may break up burst cycles into single transfer cycles, thereby causing further performance loss.

In the examples shown in FIGS. 5A-5D, the example notations shown in the figures and the tables may be as follows:

Ywr=4:2:0 YUV Write (1.5 bytes per pixel) @ movie resolution and @ movie frame rate=1.5*Movie Resolution*Movie Frame Rate*8/$10^9$ Gbps Yrd=4:2:0 YUV Read (1.5 bytes per pixel) @ movie resolution and @ movie frame rate=1.5*Movie Resolution*Movie Frame Rate*8/$10^9$ Gbps Rwr/Rwr1=32 bit ARGB or 24 bit RGB Write (4 bytes per pixel or 3 bytes per pixel) @movie resolution and @movie frame rate=RGB bytes/pixel*Movie Resolution*Movie Frame Rate*8/$10^9$ Gbps Rrd/Rrd1=32 bit ARGB or 24 bit RGB Read (4 bytes per pixel or 3 bytes per pixel) @movie resolution and @movie frame rate=RGB bytes/pixel*Movie Resolution*Movie Frame Rate*8/$10^9$ Gbps DRwr/DRwr1=32 bit ARGB or 24 bit RGB Write (4 bytes per pixel or 3 bytes per pixel) @Display resolution and @movie frame rate=RGB bytes/pixel*Display Resolution*Movie Frame Rate*8/$10^9$ Gbps DRrd0/DRrd1=32 bit ARGB or 24 bit RGB read (4 bytes per pixel or 3 bytes per pixel) @Display resolution and @ movie frame rate=RGB bytes/pixel*Display Resolution*Movie Frame Rate*8/$10^9$ Gbps DRrd=32 bit ARGB or 24 bit RGB Read (4 bytes per pixel or 3 bytes per pixel) @Display resolution and @monitor refresh rate=RGB bytes/pixel*Display Resolution*Monitor Refresh Rate*8/$10^9$ Gbps FIG. 5A Total Bandwidth=Ywr+Yrd+Rwr1+DRrd FIG. 5B Total Bandwidth=Rwr1+DRrd FIG. 5C Total Bandwidth=Rwr1+Rrd1+Rwr+DRrd FIG. 5D Total Bandwidth=DRwr1+DRrd1+DRwr+DRrd FIG. 6A Total Bandwidth=Ywr+Yrd+Rwr1+Rrd1+DRrd0+DRwr+DRrd FIG. 6B Total Bandwidth=Rwr1+Rrd1+DRrd0+DRwr+DRrd A traditional BitBLT engine may also be used to transfer the lossy image to the frame buffer, which may be suitable for transferring a windowed region within the memory block. The BitBLT engine may generate a completion interrupt to the CPU 514 at the end of the transfer such that the CPU 514 may prepare the next window. While this may be useful for a limited number of rectangles, the interrupt processing time on the CPU 514 may become a bottleneck to performance for small rectangles. Since the BitBLT engine is typically used in parallel with a CPU executing certain other tasks, if the windows are small, the completion interrupt may cause context switching on the CPU. Additionally, from a hardware perspective, smaller windows may also have memory inefficiency issues. For example, for any given rectangle, contiguous data access from Dynamic Random Access Memory (DRAM) may be limited to the width of the rectangle, and page misses (depending on the monitor resolution) take place when the following line is accessed.

In some embodiments, the CPU 514 may be used instead of the DMA or BitBLT hardware 520 to do the final composition. For example, the CPU 514 may be used to copy a lossy image, excluding any rectangles from Plane 1, to the frame buffer. However, this process may slow down the frame rate if a movie is being displayed, in part due to the frame buffer being in a non-cached memory area.

Figure 6C:
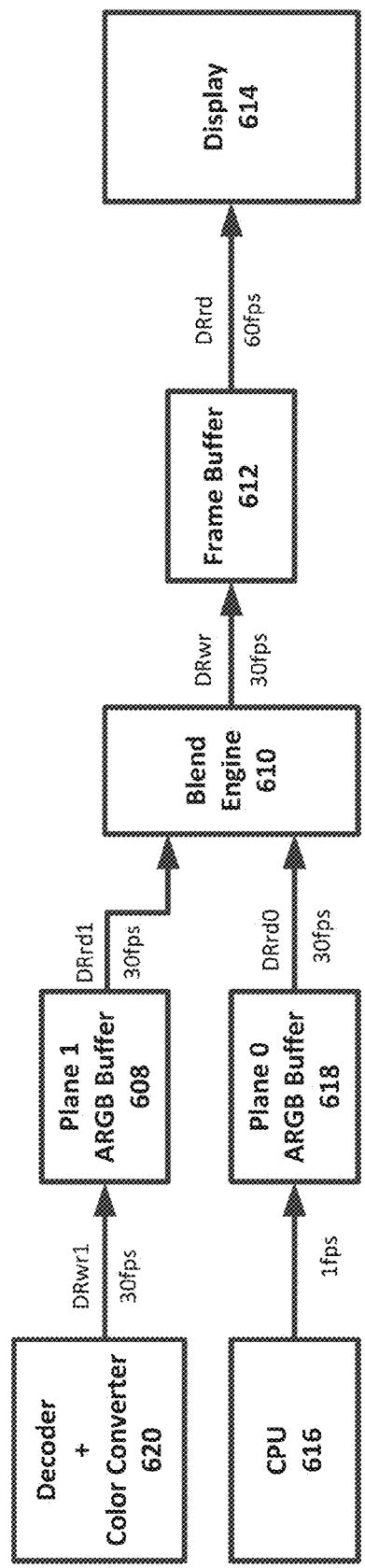

FIGS. 6A-6C illustrate block diagrams of example systems for image composition based on blending two display planes. Alpha blending is the process of blending display planes using data stored in the alpha channel to create the appearance of partial or full transparency. Transparency information for a particular pixel may be stored in the alpha channel and may indicate a level or degree of transparency associated with that particular pixel. For example, the alpha channel may store 8 bits of data that represent a level or degree of transparency on a scale of 0 to 255 for the associated pixel (e.g., 00000000=fully transparent, 1111110=slightly opaque, 11111111=fully opaque, etc.). Typical alpha blending processes use a limited number of small rectangles of pixels to keep the memory bandwidth requirement under control. When the number of rectangles cannot be predicted, it may be more useful to perform alpha blending for the entire plane (e.g., a size equal to the size of the frame buffer). The alpha blending process may require both planes to be read from memory before performing the blend operation to produce the final image in the frame buffer. Plane 1 containing lossy data, as described above, may keep the lossy image after color conversion from 4:2:0 YUV format (e.g., 1.5 bytes/pixel) to ARGB format. This plane is then blended together with Plane 0 to form the final image in the frame buffer. Generally, this alpha blending process can be taxing on the memory bandwidth, as the movie rectangle area is to be read from both Plane 0 and Plane 1 for the blending operation, even though reading from Plane 0 may be unnecessary unless there is an overlay window present on the top of movie window (e.g., file menu). FIG. 6A shows the data path used in this method. The decoder hardware 602 may send decompressed data to the YUV buffer 604, which may then be color converted using color converter 606. The decompressed data may then be sent to the Plane 1 ARGB buffer 608. The CPU 616 may decompress the static data and send the decompressed data to the Plane 0 ARGB buffer 618. The blend engine 610 may then blend the data from the Plane 1 ARGB buffer 608 and the Plane 0 ARGB buffer 618 and send the blended data to the frame buffer 612 so that it may be displayed on the display 614. Table 1 above shows the example memory bandwidth requirement of 8.88 Gbps when the movie size is 720×480 pixels and the monitor size is 1920×1080 pixels.

FIG. 6B shows an alternative solution to the system shown in FIG. 6A, where the decoder and the color converter hardware 620 are used in a pipelined fashion to reduce memory bandwidth further. Table 1 above further provides the memory bandwidth requirement of 8.63 Gbps when the movie size is 720×480 pixels and the monitor size is 1920×1080 pixels.

FIG. 6C is similar to FIG. 6B except that FIG. 6C uses a movie size that is the same as the monitor size. Table 2 shows the memory bandwidth requirement of 11.54 Gbps for such a case. In the examples shown in FIGS. 6A-6C, the example notations shown in the figures are the same as the example notations shown and described above for FIGS. 5A-5D. The alpha blending process may include reading both planes from memory before performing the blend operation to produce the final image in the frame buffer. At 30 fps in the example cases described above, the process may include an example total of four times the memory bandwidth compared to the three times for a direct ARGB transfer to the frame buffer (e.g., Table 2 excluding a final memory read for the display).

those areas may be displayed with clarity. The lossy compression algorithms may be used for dynamic data (e.g., movies) and static non-text data on the display screen. This compression algorithm may use the size of the monitor as the image size, irrespective of the size of any dynamic data windows (e.g., movies) being displayed. For example, if a movie window is running on a 1080P monitor with a movie window size of 720×480 pixels, traditional compression algorithms may send lossy image data for a 720×480 pixel window. However, a new protocol using lossy compression algorithm may use an image size of 1920×1080 pixels with data changing only in the 720×480 pixel movie window. In this case, network bandwidth optimization may be achieved because of the predicted picture frames (P-frames) available in sequence. P-frames may hold only the changes in the image from the previous frame and are thus more compressible than intra-coded picture frames (I-frames), which may be a fully specified picture such as a conventional static image.

While the use of lossy compression algorithms for the whole display screen, such as h.264/MPEG-4 Part 10, may provide network bandwidth optimization in part due to the P-frames being available in sequence, this approach may affect the memory of the thin-client terminal system. For example, an image decoder does not create an image using only the changed areas. Instead, the image decoder uses the size information to create the image. Using the example of a movie window running on a 1080P monitor with a movie window size of 720×480 pixels, even though the actual dynamic area size is 720×480 pixels, the YUV 4:2:0 image formed by the decoder will still have a size of 1920×1080 pixels. At a 30 fps rate, 720×480 pixel image writing requires 124.4 Mbps throughput from the memory, but a 1920×1080 image would require 746.5 Mbps. Additionally, a newly formed image may have several small rectangles punched in it for the lossless text data that would need to be composited later to form the final image. Without the composition, the text areas may lose clarity, and the punched areas of the newly formed image may contain unusable data.

Compositing an image from two planes with multiple overlay windows may be performed without burdening the memory bandwidth if the overlay windows are limited in number. A traditional BitBLT engine (e.g., BitBLT hardware 520 of FIGS. 5C-5D) may be employed to pull chunks of data from various planes to create a composite image. However, for numerous overlay windows, a traditional BitBLT engine may not be the most efficient device to create a composite image, as the memory accesses can be inefficient. Also, the accesses to the CPU may become a bottleneck. Blending may be used to composite such an image, but the

TABLE 2

|  | RGB Bytes/ pixel | DRwr1 - @ 30 fps (Gbps) | DRrd1 - @ 30 fps (Gbps) | DRrd0 - @ 30 fps (Gbps) | DRwr - @ 30 fps (Gbps) | DRrd - @ 60 fps (Gbps) | Total Bandwidth (Gbps) |
|---|---|---|---|---|---|---|---|
| FIG. 6B (scenario 1) | 4 | 1.99 | 1.99 | 1.99 | 1.99 | 3.98 | 11.94 |
| FIG. 6C (scenario 2) | 3 | 1.49 | 1.49 | 1.49 | 1.49 | 2.99 | 8.96 |

Figure 7C:
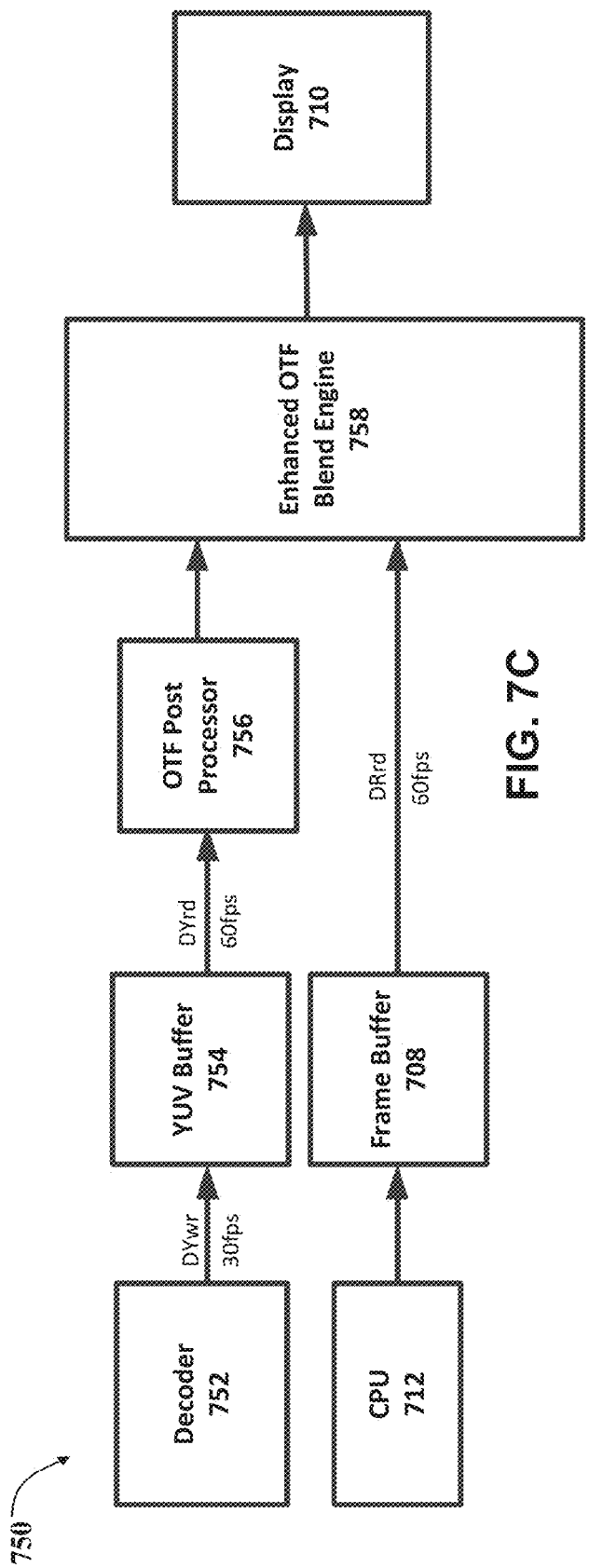

As described above, to reduce network bandwidth requirements, certain display data transfer protocols may be used to transfer more data using lossy compression algorithms, such as h.264/MPEG-4 Part 10 compression, and sending lossless data for text areas of the display so that memory overhead for blending may be high. To resolve these issues of memory inefficiency and CPU bottleneck, an enhanced blending engine may be utilized. FIGS. 7A-7D illustrate block diagrams of example systems for processing display data sent from a server to a client device using an enhanced blending engine 706 utilizing matrices to composite an image. FIG. 7A gives a high level view of an example system 700 replacing the blend engine 610 of FIG. 6C with an enhanced blend engine 706. The alpha channel data may be separated from the RGB display data and stored in an alpha channel data buffer. A macro block representation of the alpha channel data buffer is created and stored on-chip in the internal memory associated with the enhanced blend engine 706. A pixel representation may also be created and stored in external memory that is external to the enhanced blend engine 706. As shown in FIG. 7A, the decoder and color converter 702 may decompress data and color-convert the data. The decompressed and color-converted data may be sent to the Plane 1 ARGB/RGB buffer 704, which may be a first-in, first-out (FIFO) buffer. The data from the Plane 1 ARGB/RGB buffer 704 is sent to the enhanced blend engine 706 for processing. The enhanced blend engine 706 will be described in more detail below for FIG. 7D. The processed data is then sent to the frame buffer 708 so that it may be displayed on the display 710. CPU 712 may be used to decompress static data and send the decompressed data to the Plane 0 ARGB/RGB buffer 714, which may be a FIFO buffer. The data from the Plane 0 ARGB/RGB buffer 714 is sent to the enhanced blend engine 706 for processing at the rate of the fast changing plane similar to the manner in which a standard blend engine operates, and the processed data may be sent to the frame buffer 708 so that it may be displayed on the display 710. If the macro block representation of the alpha channel data buffer indicates that the alpha values for a macro block are either fully transparent or fully opaque, data from either only Plane 1 ARGB/RGB buffer 704 or only Plane 0 ARGB/RGB buffer 714 will be accessed for that pixel in order to reduce memory bandwidth. In embodiments where ARGB is 32 bits, bandwidth is reduced by using the macro block representation because less than 32 bits are accessed. FIG. 7B illustrates a block diagram of an example system 725 similar to the example system 700 of FIG. 7A, but with Plane 0 ARGB/RGB buffer 714 being read at the rate of the slow-changing plane, thereby reducing memory bandwidth further.

Table 3 below show how the blending techniques described for FIGS. 7A-7B decrease the total bandwidth requirements for fully opaque and fully transparent (e.g., non-translucent) blending when the monitor and movie size is 1920×1080 pixels.

TABLE 3

| | Process rate for Plane 0 | Inefficiency Factor | DRwr1 - @ 30 fps (Gbps) | DRrdC1 - @ 30 fps (Gbps) | DRrdC0 (Gbps) | DRwrC - @ 30 fps (average Gbps) | DRwrC @ 30 fps (worst case Gbps) | DRrd - @ 60 fps (Gbps) | Total Bandwidth (Gbps) |
|---|---|---|---|---|---|---|---|---|---|
| FIG. 7A (scenario 3) | 30 | 1 | 1.49 | 0.75 | 0.75 | 1.49 | | 2.99 | 7.46 |
| FIG. 7B (scenario 4) | 1 | 1 | 1.49 | 0.75 | 0.02 | 0.77 | | 2.99 | 6.02 |
| FIG. 7A (worst case) (scenario 5) | 30 | 2 | 1.49 | 1.49 | 1.49 | | 1.49 | 2.99 | 8.96 |
| FIG. 7B (worst case) (scenario 6) | 1 | 2 | 1.49 | 1.49 | 0.05 | | 1.49 | 2.99 | 7.51 |
| All Lossless (100% from Plane 0) (scenario 7) | 1 | 1 | 0.00 | 0.00 | 0.05 | 0.00 | | 2.99 | 3.04 |
| All Lossy (100% from Plane 1) (scenario 8) | 0 | 1 | 1.49 | 1.49 | 0.00 | 1.49 | | 2.99 | 7.46 |

In the examples shown in FIGS. 7A-7B and Table 3, the example notations may be as follows:

DRwr1=DispRes*RGB bytes/pixel*Movie Frame Rate*8/$10^9$ Gbps

DRwr=DispRes*RGB bytes/pixel*Movie Frame Rate*8/$10^9$ Gbps

DRrd1=DispRes*RGB bytes/pixel*Movie Frame Rate*8/$10^9$ Gbps

DRrd0=DispRes*RGB bytes/pixel*Movie Frame Rate*8/$10^9$ Gbps

DRrd=DispRes*RGB bytes/pixel*Monitor Refresh Rate*8/$10^9$ Gbps

DRrdC1=0.5*MovRes*RGB bytes/pixel*Movie Frame Rate*8/$10^9$ Gbps

DRrdC0=0.5*MovRes*RGB bytes/pixel*Movie Frame Rate*8/$10^9$ Gbps

DRwrC (average for aligned cases)=0.5*MovRes*RGB bytes/pixel*(Movie Frame Rate+ProRate)*8/$10^9$ Gbps DRwrC (average for misaligned cases)=MovRes*RGB bytes/pixel*Movie Frame Rate*8/$10^9$ Gbps Total Bandwidth=DRwr1+DRrdC1*Ineff+DRrdC0*ProcRate*Ineff+DRwrC1*Ineff+DRwrC0*ProcRate+DRrd Movie Frame Rate=30 fps Monitor Refresh Rate=60 Hz MovRes=Movie Resolution=1920×1080

DispRes=Display Resolution=1920×1080

Ineff=Inefficiency Factor

ProcRate=Processing Rate for Plane 0

Scenario 1 of Table 2 shows the bandwidth needed for the blending case in which both of the planes are at full display resolution and pulled at 30 fps along with the alpha channels. Scenario 2 of Table 2 shows the bandwidth needed for the blending case in which the alpha channel is separately extracted and 3 bytes/pixel are pulled. Scenario 3 of Table 3 shows the bandwidth need for the blending case where data is pulled from either Plane 0 ARGB/RGB buffer 714 or Plane 1 ARGB/RGB buffer 704, but not from both planes. Scenario 4 of Table 3 show the bandwidth needed for the blending case in which the slow-moving plane is pulled at its update rate and not at the rate of the fast-moving plane.

Scenario 5 of Table 3 shows the worst case condition for the blending case where data is pulled from either Plane 0 ARGB/RGB buffer 714 or Plane 1 ARGB/RGB buffer 704, but not from both planes. Scenario 6 of Table 3 shows the worst case condition for the blending case in which the slow-moving plane is pulled at its update rate and not at the rate of the fast-moving plane. In these scenarios, the overlay windows are small and misaligned with respect to memory accesses and the entire plane data for both planes are pulled because of memory inefficiency, as denoted by the inefficiency factor in Table 3. As shown in Table 3, even in the worst case scenario, the bandwidth reduction is greater than in the traditional blending methods.

Table 3 also shows Scenario 7, which is a corner case lossless scenario, and Scenario 8, which is a corner case lossy scenario, both of which use the enhanced blending techniques of FIGS. 7A-7B. The results for these scenarios are better than those for the traditional blending techniques of FIG. 6C, which would require fully blending operations.

In some embodiments, for images where alpha values have a translucency value (e.g., not fully opaque or fully transparent), the translucency can be reduced to representative bits, and blending may be done for only translucent areas.

blend engine 758 utilizing matrices. In FIG. 7C, the decoder 752, sends decoded display data (e.g., fast-changing display data) to the YUV buffer 754, which sends the data to the OTF post processor 756. After post processing the data, the data is sent to the enhanced OTF blend engine 758. The CPU 712 also sends display data (e.g., slow-changing display data) to the frame buffer 708, and that data is sent to the enhanced OTF blend engine 758. The data from the OTF post processor 756 and the frame buffer 708 may be blended OTF by the enhanced OTF blend engine 758 using dynamic color mode switching and/or the matrices created using alpha channel data. The blended data is then sent to the display 710 for display. In the example shown in FIG. 7C, the frame buffer is used to store lossless data in RGB format (e.g., 3 bytes/pixel). The YUV buffer may store the lossy data in 4:2:0 YUV format (e.g., 1.5 bytes/pixel). Data may be pulled from the YUV buffer 754, the frame buffer 708, or both, depending on the alpha value read from one of the matrices created from the alpha channel. In some embodiments, the bandwidth may be further optimized by scaling the YUV image to a size that is different than the native resolution size. Table 4 below shows the bandwidth associated with FIG. 7C, including the worst case scenario, the corner case lossless scenario, and the corner case lossy scenario.

TABLE 4

|  | Inefficiency Factor | DYwr - @ 30 fps (Gbps) | DYrd - @ 60 fps (Gbps) | DRrd - @ 60 fps (Gbps) | Total Bandwidth (Gbps) |
| --- | --- | --- | --- | --- | --- |
| FIG. 7C | 1 | 0.75 | 0.75 | 1.49 | 2.99 |
| FIG. 7C (worst case) | 2 | 0.75 | 1.49 | 2.99 | 5.23 |
| All Lossless (100% from Plane 0) | 1 | 0.00 | 0.00 | 2.99 | 2.99 |
| All Lossy (100% from Plane 1) | 1 | 0.75 | 1.49 | 0.00 | 2.24 |

In some embodiments, dynamic switching between color modes may be used to reduce memory bandwidth requirements during blending techniques. For example, if both planes need to be read and the bandwidth is low, the display data may be converted from true color mode to high color mode before blending the planes. The data may be converted for one or both planes. In some embodiments, the fast-changing plane is converted from true color mode to high color mode to reduce memory bandwidth requirements. In another example, blending may be performed for planes having data in different color modes (e.g., one plane in true color mode and one plane in high color mode) by extending the lower order bits of the high color mode data during the blending process. In some embodiments, a 16-bit plane may be created in the enhanced blend engine 706 hardware by creating a 16-bit RGB plane (e.g., 5 bits for red, 6 bits for green, 5 bits for blue) and a corresponding 8-bit RGB buffer (e.g., 3 bits for red, 2 bits for green, 3 bits for blue) from a 24-bit RGB plane (e.g., 8 bits for red, 8 bits for green, 8 bits for blue).

In some embodiments, memory bandwidth may be reduced by using an on-the-fly (OTF) blend engine utilizing dynamic color mode switching and the matrices created using alpha channel data. FIG. 7C illustrates a block diagram of an example system 750 for processing display data sent from a server to a client device using an enhanced OTF In the examples shown in FIG. 7C and Table 4, the example notations may be as follows:

DYwr=MovRes*YUV bytes/pixel*Movie Frame rate*8/$10^9$ Gbps

DYrd=0.5*MovRes*YUV bytes/pixel*Movie Frame rate*8/$10^9$ Gbps

DRrd=0.5*DispRes*RGB bytes/pixel*Monitor Refresh Rate*8/$10^9$ Gbps

Total Bandwidth=DYwr+Ineff*DYrd+Ineff*DRrd

Movie Frame Rate=30 fps

Monitor Refresh Rate=60 Hz

MovRes=Movie Resolution=1920×1080

DispRes=Display Resolution=1920×1080

Ineff=Inefficiency Factor

Figure 7D:
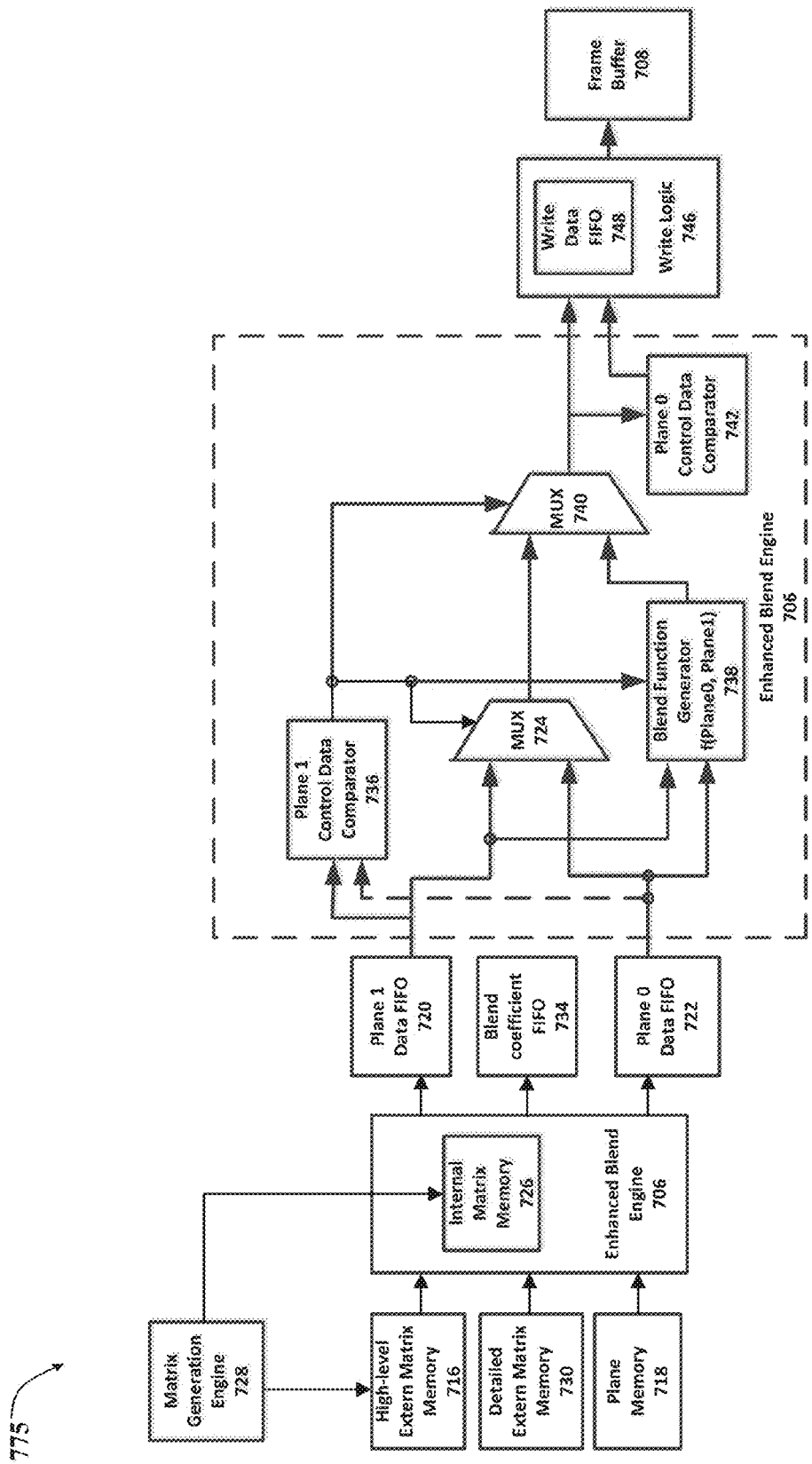

FIG. 7D further illustrates a block diagram of an example system 775 for processing display data sent from a server to a client device using an enhanced blend engine 706 utilizing matrices. The matrices carry information relating to transparency and opacity of pixels of the planes that are to be composited. For example, in the case of a two-plane arrangement (e.g., graphics and movie), the matrix may contain information indicating the areas that are to be read from the graphics plane and the movie plane. The enhanced blend engine 706 is not controlled by the CPU and does not interrupt the CPU until an entire frame is composited. A tiered matrix structure may be provided to offer a coarse, intermediate, and exact granularity of transparency and translucency information. This matrix structure may offer faster access to the more frequently used transparency information and slower access to the less frequently used boundary and exact blending information. The tiered matrix structure may be generated by a matrix generation engine 728 using information received via the alpha channel and/or overlay rectangle information. The tiered matrix structure may include an internal matrix and a high-level external matrix that may be generated by the matrix generation engine 728 in a manner similar to that described in the related United States patent application titled "Systems and Methods for Hardware-Accelerated Key Color Extraction" having Ser. No. 13/913,206, filed Jun. 7, 2013, which is hereby incorporated by reference in its entirety. The high-level external matrix may be stored in high-level external matrix memory 716, which may be a buffer in the external random access memory (RAM), and may contain transparency data indicating transparency information at the pixel level. The internal matrix may be stored in the internal matrix memory 726 of the enhanced blend engine 706 and may contain transparency data indicating a coarse indication of transparency for pixels and/or macro blocks of a frame. In addition, a detailed external matrix memory 730 is used to store the detailed external matrix having exact translucency level data for every pixel in the slow changing plane (e.g., Plane 0 of FIG. 8). Details of how these matrices are generated and stored is described in more detail below for FIG. 8. The transparency data in these matrices indicate whether a particular pixel or macro block is fully transparent, fully opaque, and/or translucent, including a level of translucency.

The tiered matrix structure may have an internal matrix stored in the internal matrix memory 726 of the enhanced blend engine 706. The internal matrix may include transparency data for each macro block of a display screen (e.g., as opposed to having transparency data for each pixel in one of the external matrices). A macro block of a display screen may be a rectangular region having a size that is a particular number of pixels wide and a particular number of pixels high (e.g., a macro block may be 8 pixels wide by 8 pixels high). For explanatory purposes, the examples described throughout the description may include an implementation using 8-pixel by 8-pixel macro blocks. However, one of ordinary skill in the art will recognize that a macro block of any suitable size may be used. The enhanced blend engine 706 may use the internal matrix and/or the external matrices to determine whether a particular pixel is to be read from Plane 0 or Plane 1. The particular pixel may be either a pixel of a macro block that corresponds to the transparency data for that macro block in the internal matrix or a pixel that corresponds to the transparency data for that pixel in one of the external matrices. Plane 0 and Plane 1 may be stored in plane memory 718. The enhanced blend engine 706 reads each row of the accessed matrix to determine the transparency data of the corresponding row in the planes to be read. When reading the internal matrix, the enhanced blend engine 706 determines the macro block containing the particular pixel by converting the address of the particular pixel to the corresponding macro block address. For example, for an 8 pixel by 8 pixel macro block, the macro block x-coordinate address will be the pixel x-coordinate address divided by 8, and the macro block y-coordinate address will be the pixel y-coordinate address divided by 8. Once the macro block for that particular pixel is located within the internal matrix, the transparency data for that macro block will be the transparency data for the particular pixel within that macro block. In some embodiments, address conversion may not be needed when reading one of the external matrices as transparency data for each pixel may be available in that matrix. If the transparency data indicates that a particular pixel is to be read from Plane 0, the enhanced blend engine 706 may pull data for that area from Plane 0 and put the data in the Plane 0 FIFO 722. The enhanced blend engine 706 may then insert control data into the corresponding addresses in Plane 1 FIFO 720, which may indicate that data was not read from Plane 1, and Plane 0 data is to be used for display composition. If the transparency data indicates that the data is to be read from Plane 0, but no update has taken place in Plane 0 since the last read of Plane 0, data will not be read from Plane 0. The enhanced blend engine 706 will insert control data into Plane 1 FIFO 720 which indicates that data should not be written from the Plane 1 FIFO 720 and will insert control data into Plane 0 FIFO 722 which indicates that no writes should happen to the frame buffer from Plane 0 FIFO 722.

If the transparency data indicates that a particular pixel is to be read from Plane 1, the enhanced blend engine 706 may pull data for that area from Plane 1 and send the data to the Plane 1 FIFO 720. The enhanced blend engine 706 may then insert control data into the corresponding addresses in Plane 0 FIFO 722, which may indicate that data was not read from Plane 0, and data from Plane 1 is to be used for display composition.

If the transparency data indicates that a blending operation is to be used, then pixels from both Plane 0 and Plane 1 are read. The enhanced blend engine 706 may pull data for that area from both Plane 0 and Plane 1 and send the data to the Plane 0 FIFO 722 and Plane 1 FIFO 720, respectively. The enhanced blend engine 706 may insert different control data into Plane 1 FIFO 720 as part of the RGB data to indicate that a blend operation is to be performed for display composition. In addition to reading the data from Plane 0 and Plane 1, the enhanced blend engine 706 may also read alpha data for the corresponding pixels of Plane 0 (or use a preset alpha coefficient depending on the register programming) from the detailed external matrix memory 730 and send the data to the blend coefficient FIFO 734. In some embodiments, when a blending operation is not performed, the blend coefficient FIFO 734 may contain a pre-determined "don't care" data entry. In other embodiments, plane memory 718 may use the ARGB format to store slow-moving plane (e.g., Plane 0) contents instead of using the RGB format for Plane 0 plane memory 718 with a separate detailed external matrix memory 730. In this case, the blend coefficient FIFO 734 may not be used. However, the overall bandwidth requirement may increase due to wider memory write and read accesses.

The data from the Plane 0 FIFO 722 and the Plane 1 FIFO 720 is combined using a MUX 724, a blend function generator 738, and another MUX 740 before being sent out through write logic engine 734 to the frame buffer 708. The control data inserted into the Plane 1 FIFO 720 provides control over the selection of data to the MUX 724, blend function generator 738, and MUX 740. In another embodiment, the control data inserted into the Plane 1 FIFO 720 and the control data inserted into the Plane 0 FIFO 722 together provide control over the selection of data to the MUX 724, blend function generator 738, and MUX 740. The MUX 724 selection is based on the control data associated with that particular pixel in the Plane 1 FIFO 720. The plane 1 control data comparator 736 compares the incoming data from Plane 1 against the control data for Plane 1 FIFO 720 and provides this selection control for MUX 724. In some embodiments, the blend function is enabled when a portion of incoming data (e.g., upper 8 bits) matches the special control code programmed for blending. In other embodiments, the blend function is enabled when the comparison between incoming data from Plane 1 FIFO 722 fails against the control data for Plane 1 FIFO 720 and when comparison between incoming data from Plane 0 FIFO 722 fails against the control data for Plane 0 FIFO 722. This blend function comparison result may also be used to select the blended data path on MUX 740. Byte masking or data write decisions depend upon the control data in the Plane 0 FIFO 722, and the Plane 0 control data comparator 742 creates this control for write logic engine 746 by comparing the MUX 724 output data against the control data for Plane 0 FIFO 722. The selected data is then sent to the write data FIFO 748 of the write logic engine 746 before writing to the frame buffer 708 for display on the display screen.

In some embodiments, the control data inserted into a fast-changing plane FIFO indicates that data is to be pulled from a slow-changing plane. In some embodiments, the slow-changing plane is only read when the slow-changing plane has been updated. Otherwise, the data from the slow-changing plane is not read. In this case, no data from either the slow-changing plane FIFO or the fast-changing plane FIFO is written to the frame buffer. In another embodiment, both fast-changing and slow-changing planes are read into their respective FIFOs to execute a blending operation. The control data inserted into the slow-changing plane FIFO indicates whether the slow-changing plane data is to be written to the frame buffer or not. The writes to the frame buffer memory may be masked or may not be issued if no new updates have happened to the slow-changing plane. Table 5 below provides an example of data selection and write masking logic. In this example, 0xffffffff is used as the control data for both Plane 1 FIFO and Plane 0 FIFO, and 0xf0 in the upper 8 bits of Plane 1 FIFO data is used as the control data for the blend function. In this case, the blended data is written to the memory when the Plane 1 FIFO control data shows 0xf0 in the upper 8 bits of Plane 1 FIFO data. This example uses external plane memory storage in RGB format with the detailed external matrix memory used to store alpha information. The top 8 bits of Plane 0 FIFO data denote the contents of corresponding blend coefficient FIFO data, and '00' is used as the pre-determined "don't care" value when blending is not used. In the case of ARGB embodiment detailed earlier (e.g., where the detailed external matrix memory is not used), the top 8 bits of Plane 0 FIFO data may show 'ff' to denote fully opaque data.

TABLE 5

| Plane 1 FIFO Data | Plane 0 FIFO Data | After MUX 724 | After MUX 740 | After Write Logic Component |
|---|---|---|---|---|
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0xffffffff | 0x00040506 | 0x00040506 | 0x00040506 | 0x00040506 |
| 0xffffffff | 0x00040506 | 0x00040506 | 0x00040506 | 0x00040506 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0x00010203 | 0xffffffff | 0x00010203 | 0x00010203 | 0x00010203 |
| 0xffffffff | 0xffffffff | 0xffffffff | 0xffffffff | Skipped |
| 0xffffffff | 0xffffffff | 0xffffffff | 0xffffffff | Skipped |
| 0xffffffff | 0xffffffff | 0xffffffff | 0xffffffff | Skipped |
| 0xffffffff | 0xffffffff | 0xffffffff | 0xffffffff | Skipped |
| 0x00010203 | 0xffffffff | 0x00010203 | 0x00010203 | 0x00010203 |
| 0x00010203 | 0xffffffff | 0x00010203 | 0x00010203 | 0x00010203 |
| 0xf0010203 | 0x80030201 | F(Blend) | F(Blend) | F(Blend) |
| 0xf0010203 | 0x80030201 | F(Blend) | F(Blend) | F(Blend) |
| 0xf0010203 | 0x80030201 | F(Blend) | F(Blend) | F(Blend) |
| 0xf0010203 | 0x80030201 | F(Blend) | F(Blend) | F(Blend) |

The blend function as shown in the table above may use different equations based on the implementation. In some embodiments, the output of the blend function may be defined as follows: F(Blend)=BCP0*RGB(Plane 0)+(1−BCP0)*RGB(Plane 1), where BCP0 is the blend coefficient for Plane 0 data.

Figure 8:
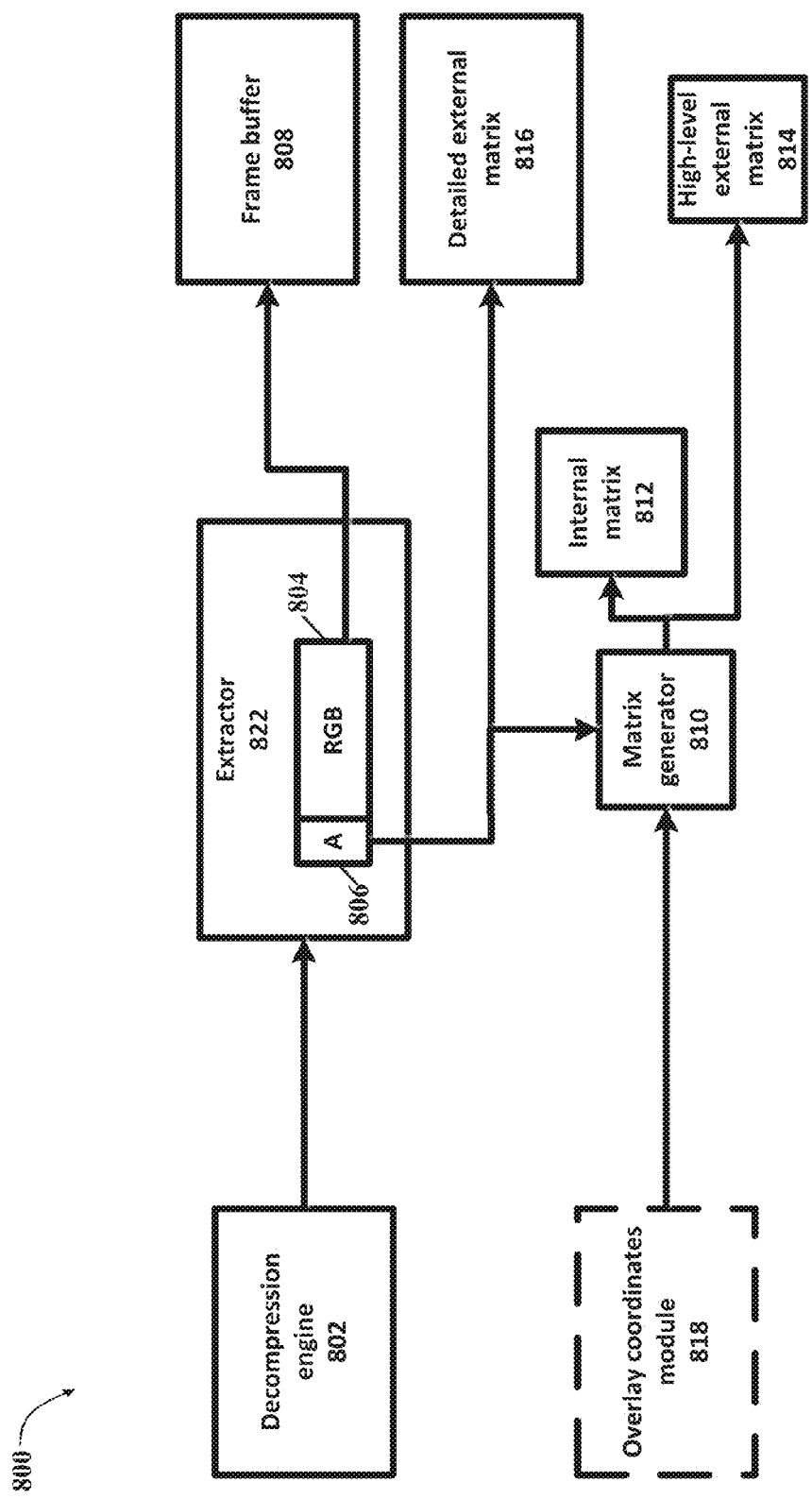
FIG. 8 illustrates a block diagram of an example system for generating matrices used to composite an image, according to some embodiments.

FIG. 8 illustrates a block diagram of an example system 800 for generating matrices used to composite an image. The decompression engine 802 may decompress display data received from the thin-client server system 220. When the display data has a populated alpha channel to be used for blending display planes, the 8-bit alpha channel data 806 may be extracted from the 32-bit decompressed display data after decompression using an extractor 822. The remaining 24-bit RGB data 804 extracted from the 32-bit decompressed display data may be written to the frame buffer 808 while the alpha channel data may be written to the detailed external matrix 816 and may be used by matrix generator 810 to generate an internal matrix 812 and a high-level external matrix 814.

The alpha channel denotes the level of transparency of a pixel (e.g., fully transparent, fully opaque, a particular level of translucency, etc.). The alpha channel may denote any level of transparency of a pixel over any range of transparency levels. In some embodiments, a portion of a display area with pixels having transparency levels that are similar (e.g., pixels with transparency levels within a particular predetermined range) may be represented in the internal matrix 812 and/or the high-level external matrix 814 as having the same transparency level. For example, if a group of pixels has transparency values that are similar, the transparency values may be averaged and the average transparency value may be used to represent those pixels in the internal matrix 812 and/or the high-level external matrix 814.

The detailed external matrix 816 may be external to the enhanced blend engine 706 and may store transparency information relating to the exact transparency, translucency, or opacity of each pixel represented in the detailed external matrix 816, as provided in the alpha channel data 806. In some embodiments, the detailed external matrix 816 is used when there is sufficient memory bandwidth available. In some embodiments, the detailed external matrix 816 may be used for small portions of the display area that are to be blended and/or have transparency values that differ beyond a particular predetermined range. For example, the detailed external matrix 816 may be used to display a translucent menu over a movie window.

The matrix generator 810 may also use the alpha channel data 806 to generate an internal matrix 812 and a high-level external matrix 814. In some embodiments with no available alpha channel information (e.g., 24-bit RGB display mode), overlay window coordinate information from the overlay coordinates module 818 may be used to generate the internal matrix 812 and the high-level external matrix 814. However, the overlay coordinates module 818 is an optional module. In some embodiments, the overlay coordinates module 818 may be used when the alpha channel is not available. The internal matrix 812 may be stored on-chip in the enhanced blend engine 706 and may store transparency information relating to the transparency, translucency, or opacity of each macro block represented in the internal matrix 812. A macro block of a display screen may be a rectangular region having a size that is a particular number of pixels wide and a particular number of pixels high (e.g., a macro block may be 8 pixels wide by 8 pixels high). For explanatory purposes, the examples described throughout the description may include an implementation using 8-pixel by 8-pixel macro blocks. However, one of ordinary skill in the art will recognize that a macro block of any suitable size may be used. The high-level external matrix 814 may be external to the enhanced blend engine 706 and may store high-level transparency information relating to the transparency, translucency, or opacity of each pixel represented in the high-level external matrix 814.

The matrices 812, 814, and 816 carry information relating to transparency, translucency, and opacity of pixels of the planes that are to be composited. For example, in the case of a two-plane arrangement (e.g., graphics and movie), a matrix may contain information indicating the areas that are to be read from the graphics plane and/or the movie plane. The enhanced blend engine 706 is not controlled by the CPU and does not interrupt the CPU until an entire frame is composited. A tiered matrix structure may be provided to offer a coarse, intermediate, and exact granularity of control. The tiered matrix structure may be generated by the matrix generator 810 using information received via the alpha channel 806 and/or overlay coordinates information 818. The tiered matrix structure may include an internal matrix 812 and external matrices 814 that may be generated by the matrix generator 810 in a manner similar to that described in the related United States patent application titled "Systems and Methods for Hardware-Accelerated Key Color Extraction" having Ser. No. 13/913,206, filed Jun. 7, 2013, which is hereby incorporated by reference in its entirety. The tiered matrix structure may also include an external matrix 816 containing the alpha values for each pixel. The external matrices 814 and 816 may be stored in memory external to the enhanced blend engine 706, which may be a buffer in the external random access memory (RAM), and may contain transparency data indicating transparency information at the pixel level. The internal matrix 812 may be stored in the enhanced blend engine 706 and may contain data indicating a coarse indication of transparency for macro blocks of a frame. The data in the internal matrix indicates whether a particular macro block is fully transparent, fully opaque, fully translucent, or a combination of these (e.g., indicating a boundary condition). The high-level external matrix 814 may contain data indicating whether a particular pixel is transparent, opaque, or translucent. The high-level external matrix 814 may be accessed when the internal matrix 812 indicates a boundary condition. The detailed external matrix 816 may contain data indicating the exact translucency level of each pixel. The detailed external matrix 816 is accessed when the internal matrix 812 and the high-level external matrix 814 indicate a blend function (e.g., translucent data) and when a predetermined blend coefficient is not used.

The enhanced blend engine 706 may use the internal matrix 812 and/or the external matrices 814 and 816 to determine whether a particular pixel is to be read from Plane 0, Plane 1, or both planes. The particular pixel may be either a pixel of a macro block that corresponds to the transparency data for that macro block in the internal matrix 812 or a pixel that corresponds to the transparency data for that pixel in the external matrices 814 and 816. The enhanced blend engine 706 reads each row of the accessed matrix to determine the transparency data of the corresponding row in the planes to be read. When reading the internal matrix 812, the enhanced blend engine 706 determines the macro block containing the particular pixel by converting the address of the particular pixel to the corresponding macro block address. For example, for an 8 pixel by 8 pixel macro block, the macro block x-coordinate address will be the pixel x-coordinate address divided by 8, and the macro block y-coordinate address will be the pixel y-coordinate address divided by 8. Once the macro block for that particular pixel is located within the internal matrix 812, the transparency data for that macro block will be the transparency data for the particular pixel within that macro block. In some embodiments, address conversion may not be needed when reading the external matrices 814 and 816 as transparency data for each pixel may be available in those matrices. If the transparency data indicates that a particular pixel is to be read from Plane 0, the enhanced blend engine 706 may pull data for that area from Plane 0 and put the data in the frame buffer 808. If the transparency data indicates that a particular pixel is to be read from Plane 1, the enhanced blend engine 706 may pull data for that area from Plane 1 and put the data in the frame buffer 808. If the transparency data indicates that Plane 0 and Plane 1 are to be blended based on a certain level of translucency, the display planes are read according to the level of translucency indicated by the transparency data.

Figure 9:
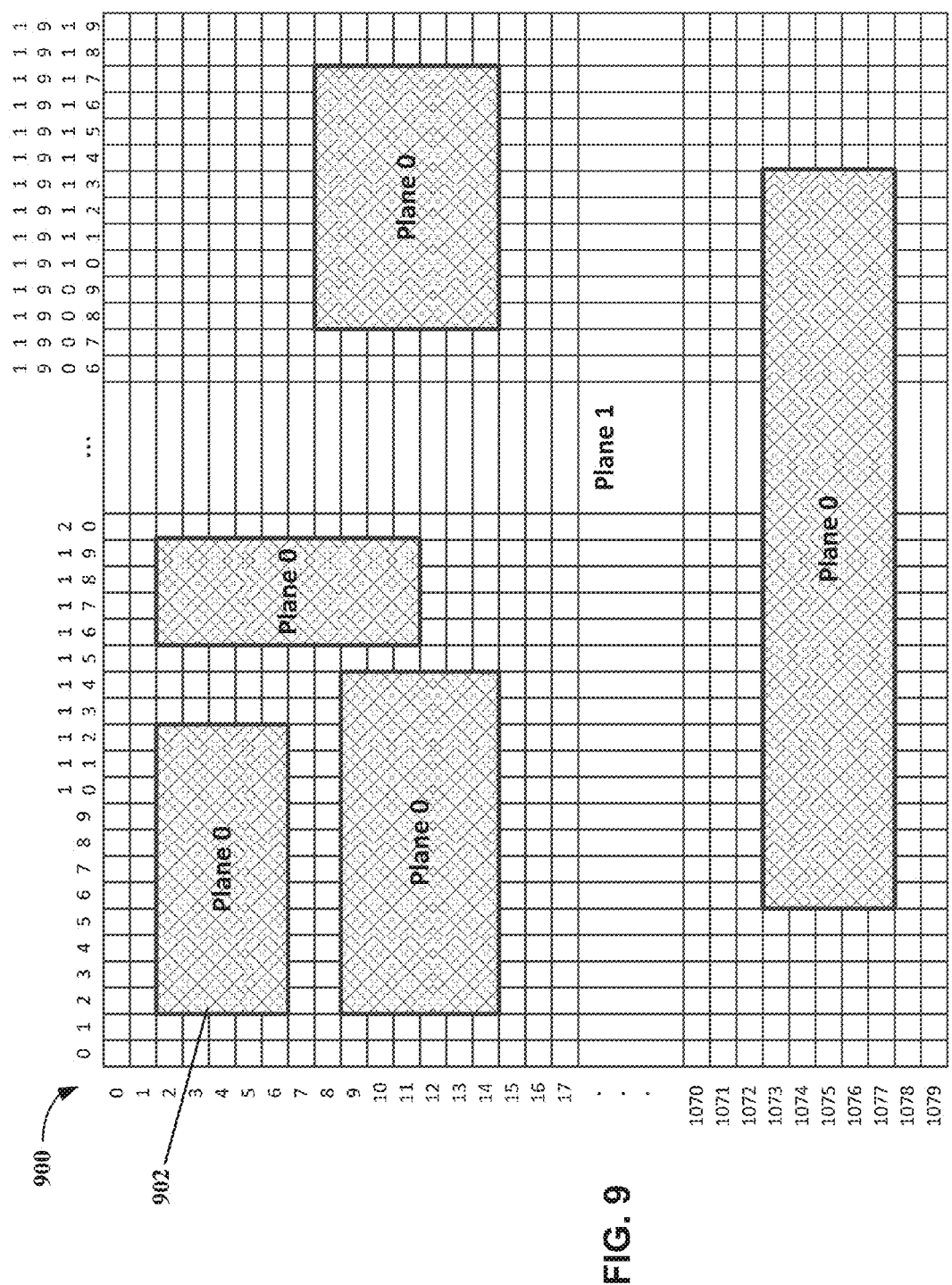
FIG. 9 illustrates a display diagram of an example display screen with overlay windows, according to some embodiments.

FIG. 9 illustrates a display diagram of an example display screen 900 with overlay windows, such as overlay window 902. The overlay windows that indicate Plane 0 may be lossless windows. The remaining display area may include the lossy image. In some embodiments, the overlay windows may be areas for which display data is pulled from Plane 0 ARGB/RGB 714, while the remaining display areas are to be pulled from Plane 1 ARGB/RGB 704. In some embodiments, the example display screen 900 may be rendered by blending Plane 0 ARGB/RGB 714 and Plane 1 ARGB/RGB 704.

In some embodiments, for bandwidth optimization purposes, a row lock register or a row and column lock register may be used to indicate which sections of a particular window have completed processing. Another set of registers may be used to provide sliding window information. The lock and the sliding window registers are used by a slow-changing plane to determine when to read from the slow-changing plane. The slow-changing plane controls may use the lock and sliding window registers to determine what to read from the matrix and consequently from the plane data. The fast-changing plane controls may directly read the matrix to determine what portions to read from fast-changing plane.

When an overlay area is populated in the matrix, the corresponding bits in the row and/or column registers are set. The sliding window starts at the beginning of the matrix and traverses all the way to the end before going back to the start. The size of the sliding window depends on the rate of change in the slow plane. The matrix rows and lock bits corresponding to the sliding window cannot be updated until the sliding window moves and are reset once the window moves down. The slow-changing plane is not read for composition if the lock bits are in a reset state, indicating that the data from the slow-changing plane has already been read, sent to the composite buffer, and no new data has been added to the slow-changing plane. This reduces the bandwidth by avoiding Plane 0 reads when they may not be needed (e.g., as opposed to blending when both of the planes are to be read at the speed of the fast-changing plane) and reducing writes to the composite buffer. The lock bits will be set again when the matrix areas corresponding to the bits are updated for overlays.

To reduce memory accesses associated with a pixel-based bitmap matrix, as described above, a tiered approach may be used. In this approach, the display area may be divided into 8 pixel by 8 pixel macro blocks, and an internal matrix may be created in the internal memory of the enhanced blend engine 706. In some embodiments, two bits may be used to represent the transparency level of the macro block. The external pixel-based matrices described above may be stored in external RAM and may be accessed when the enhanced blend engine 706 determines that the internal matrix does not contain the data needed.

Figure 10:
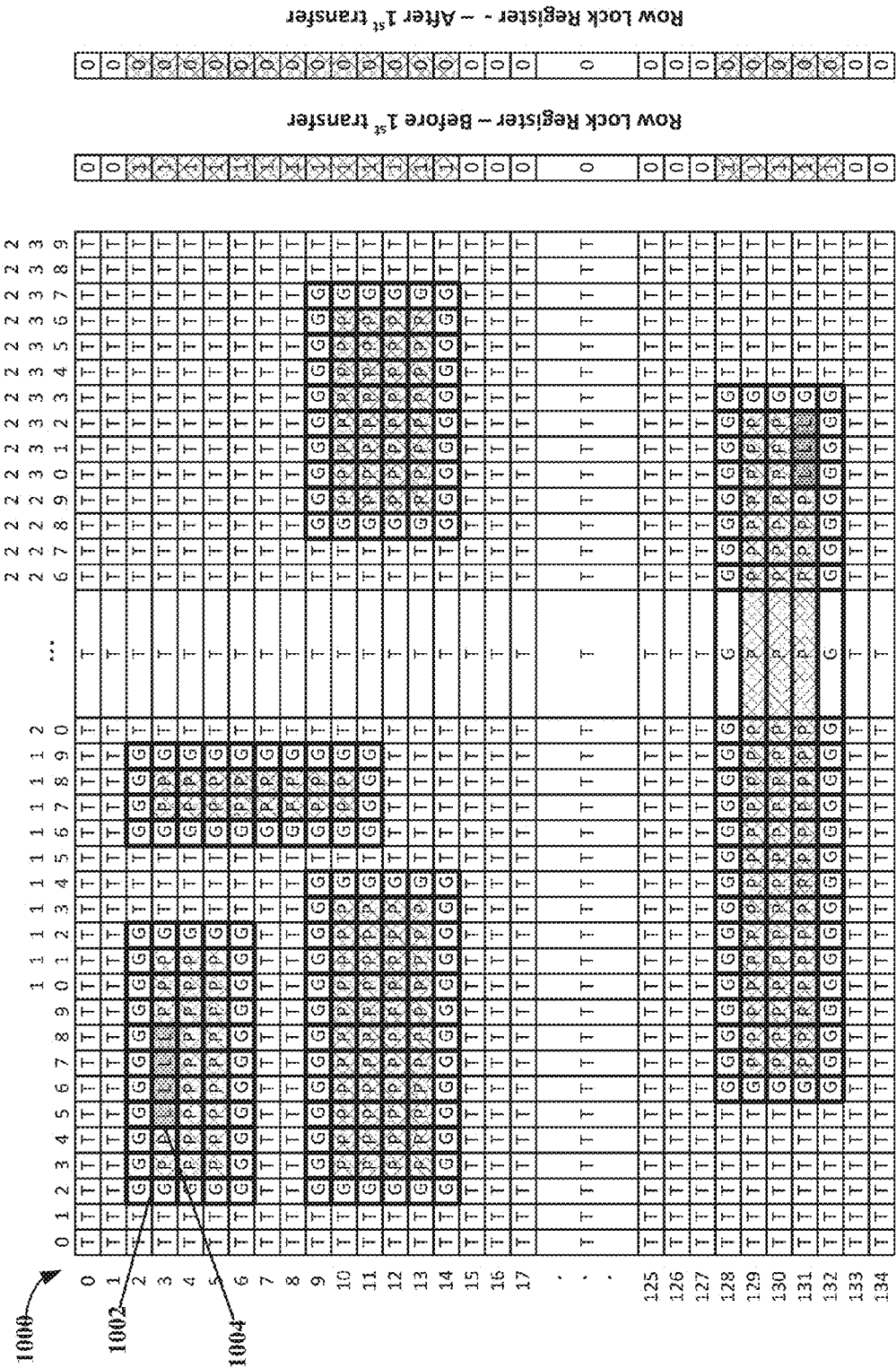
FIG. 10 illustrates a diagrammatic representation of an example internal matrix identifying the transparency of macro blocks of a display screen, according to some embodiments.

FIG. 10 illustrates a diagrammatic representation of an example internal matrix 1000 (similar to internal matrix 812) identifying the transparency of macro blocks of a display screen. The display diagram of FIG. 10 corresponds to the display diagram of FIG. 9 and shows the overlay window 1002 corresponding to the overlay window 902 of FIG. 9. As shown in the internal matrix 1000, the transparency data of each macro block may indicate whether the entire macro block is fully transparent (T), fully opaque (P), whether the pixels in the macro block are translucent (L), or if the macro block contains a combination of fully transparent, translucent, and/or fully opaque pixels (G) (e.g., along a border of an overlay window), where these indications may be represented in the internal matrix 1000 by two bits of data (e.g., T=00, L=01, G=10, P=11). If a macro block is fully opaque, lossless data for that macro block may be pulled from the Plane 0 ARGB/RGB 714. If a macro block is fully transparent, lossy data for that macro block may be pulled from the Plane 1 ARGB/RGB 704. If the macro block contains translucent pixels, data from both the Plane 0 ARGB/RGB 714 and Plane 1 ARGB/RGB 704 may be obtained, and, depending on the register bit settings for the macro block (e.g., macro block 1004 shown in FIG. 10), the data from the display planes may be blended based on either a predetermined alpha value or the full alpha value in the detailed external matrix 816. The predetermined alpha value may be the average of the alpha values for a given set of pixels (e.g., pixels in a macro block). The register bit setting which indicates whether to use the predetermined alpha value or the full alpha value in the detailed external matrix 816 may depend on any relevant factors, such as the memory bandwidth available, the blend area, and the like. In some embodiments, the predetermined alpha value may be used by default. When a matrix is read and the amount of the display area to be blended is determined to be below a certain threshold, the register bit may be set to use the full alpha value in the detailed external matrix 816. In some embodiments, the generation of the predetermined alpha value may be extended to several alpha values for different regions of the frame buffer. If the macro block contains a combination of fully transparent, translucent, and/or fully opaque pixels indicating a window boundary, the enhanced blend engine 706 may access the high-level external matrix 814 to obtain boundary information on a pixel-by-pixel basis.

Figure 11:
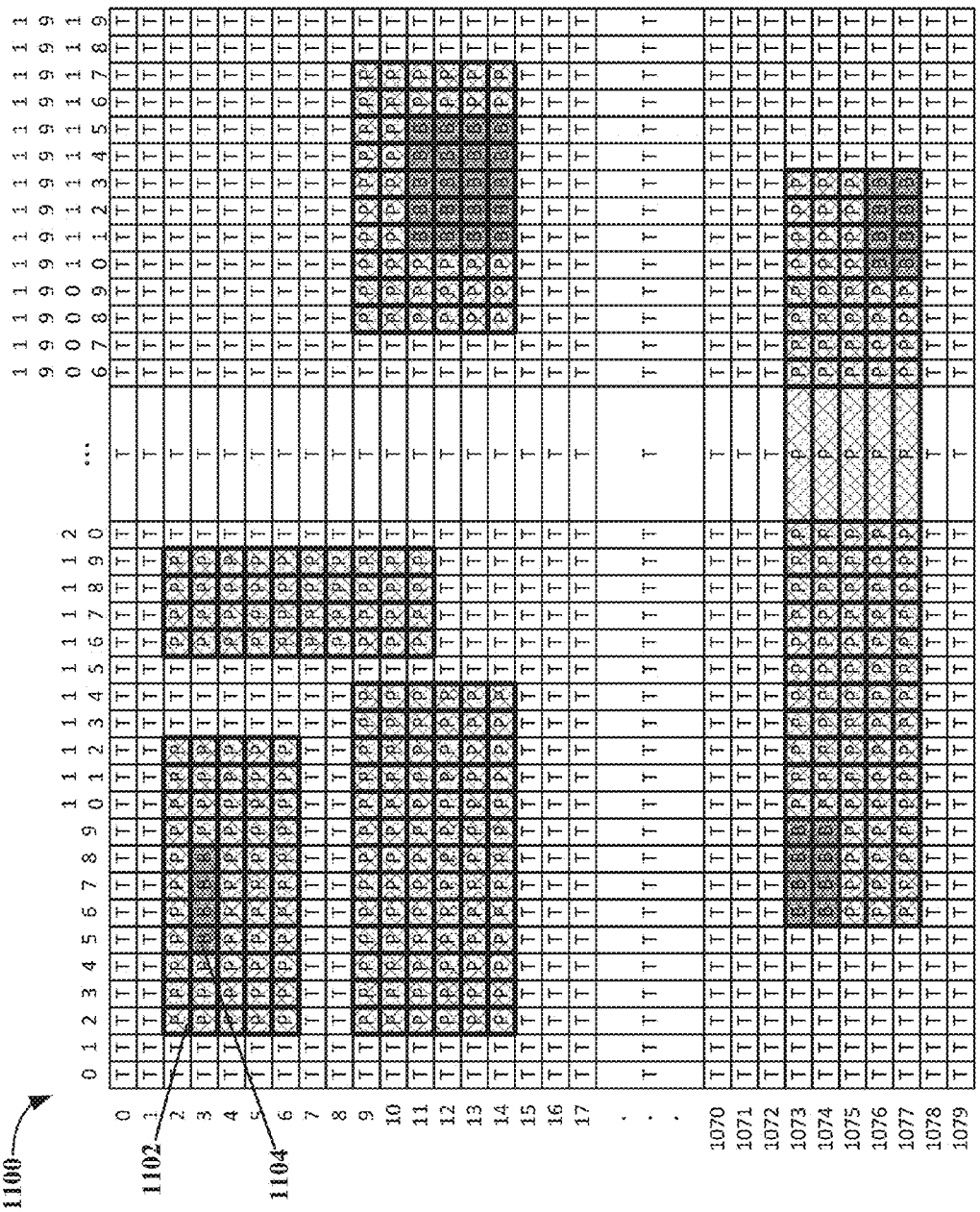
FIG. 11 illustrates a diagrammatic representation of an example external matrix identifying the boundary conditions of a display screen, according to some embodiments.

FIG. 11 illustrates a diagrammatic representation of a high-level external matrix 1100 (similar to high-level external matrix 814) identifying the boundary conditions of a display screen. The high-level external matrix 1100 may be a pixel representation of the alpha channel that is stored in memory external to the enhanced blend engine 706. The display diagram of FIG. 11 corresponds to the display diagram of FIG. 9 and shows the overlay window 1102 corresponding to the overlay window 902 of FIG. 9. As shown in the external matrix 1100, the transparency data of each pixel may indicate whether the pixel is fully transparent (T), fully opaque (P), or translucent (B), where these indications may be represented by two bits of data (e.g., T=00, P=11, B=10). If a pixel is fully opaque, lossless data for that pixel may be pulled from the Plane 0 ARGB/RGB 714. If a pixel is fully transparent, lossy data for that pixel may be pulled from the Plane 1 ARGB/RGB 704. If a pixel is translucent, data from both the Plane 0 ARGB/RGB 714 and Plane 1 ARGB/RGB 704 may be obtained, and, depending on the register bit settings for the macro block (e.g., macro block 1104 shown in FIG. 11), the data from the display planes may be blended based on either a predetermined alpha value or the full alpha value in the detailed external matrix 816.

In some embodiments, since the alpha values are based on the final display, the matrices may be repurposed for the YUV buffer, which contains data in the native resolution size. If a YUV image is up-sampled from the native resolution size, the matrix window will be resized down before use. Similarly, if a YUB image is down-sampled from the native resolution size, the matrix window will be resized up. If the windows fall on a boundary, the boundary will be included in the window size for the YUV buffer. The corresponding high-level external matrix 814 boundary values will be used to choose the final boundary.

Figure 12:
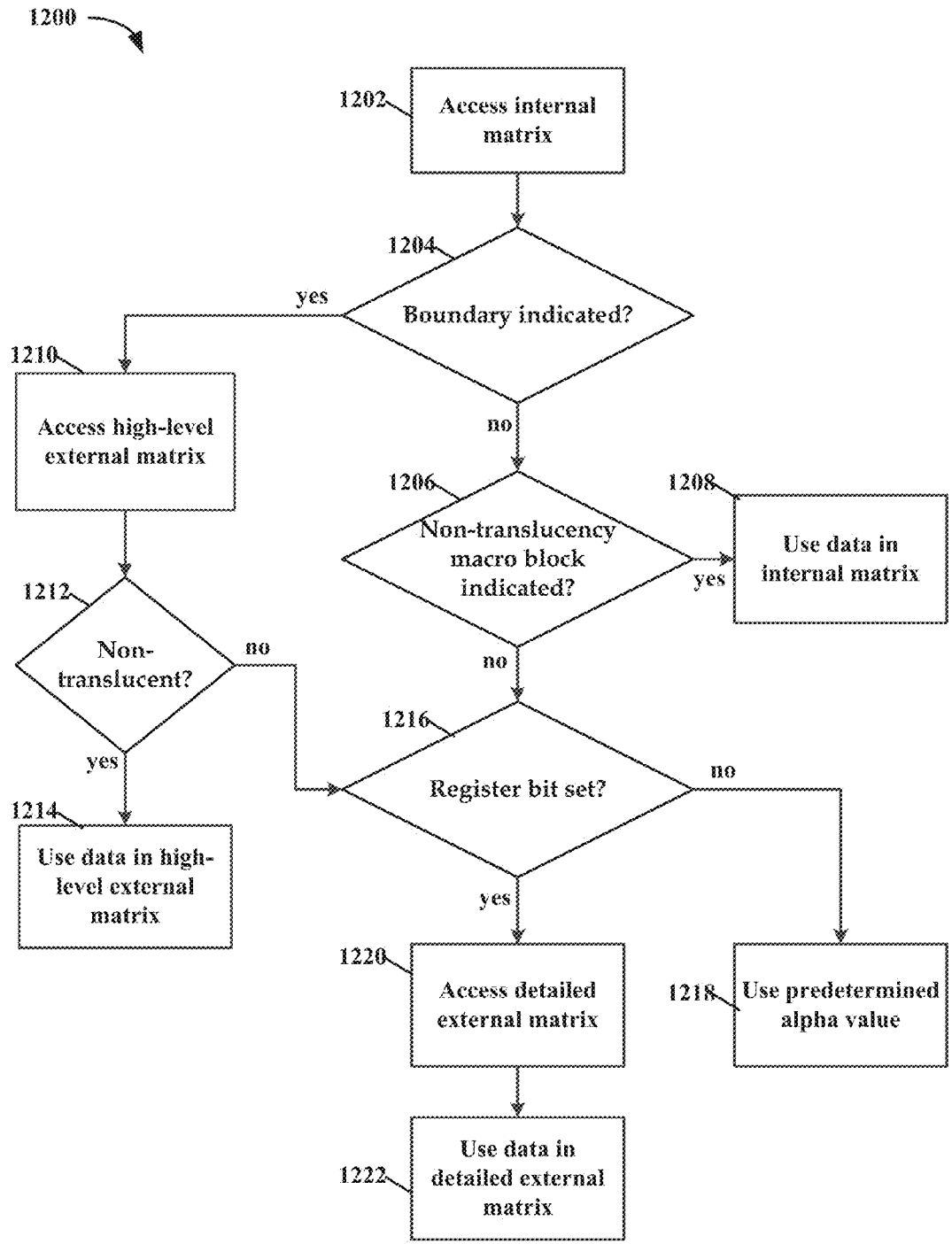
FIG. 12 illustrates a flow chart of an example method of using matrices to blend display planes, according to some embodiments.

FIG. 12 illustrates a flow chart of an example method 1200 of using matrices to blend display planes. When display data is received from a thin-client server computer system 220, the data is decompressed and the matrices are created as described for FIG. 8. In operation 1202, for each pixel of data, the enhanced blend engine 706 may access the internal matrix 812 to obtain transparency data for the macro block that the pixel belongs to.

In operation 1204, the enhanced blend engine 706 may determine whether the internal matrix 812 indicates a boundary window within the macro block.

In operation 1206, if the enhanced blend engine 706 determines that the internal matrix 812 does not indicate a boundary window within the macro block, the enhanced blend engine 706 may determine whether the macro block indicates non-translucency data (e.g., fully opaque macro block or fully transparent macro block).

In operation 1208, if the enhanced blend engine 706 determines that the macro block is non-translucent, the transparency in the internal matrix may be used to access the display data from the appropriate display plane accordingly. For example, if the macro block is fully transparent, data from the Plane 1 ARGB/RGB 704 may be read. If the macro block is fully opaque, data from the Plane 0 ARGB/RGB 714 may be read.

In operation 1216, if the enhanced blend engine 706 determines that the macro block is translucent (operation 1206), the enhanced blend engine 706 may determine whether the register bit associated with the macro block is set.

In operation 1218, if the register bit associated with the macro block is not set, the predetermined alpha value for the macro block may be used to blend Plane 0 ARGB/RGB 714 and Plane 1 ARGB/RGB 704 accordingly.

In operation 1220, if the register bit associated with the macro block is set, the detailed external matrix 816 may be accessed. In operation 1222, the transparency data in the detailed external matrix 816 may be used to blend Plane 0 ARGB/RGB 714 and Plane 1 ARGB/RGB 704 accordingly.

Referring back to operation 1204, if the enhanced blend engine 706 determines that the internal matrix 812 indicates a boundary window within the macro block, the high-level external matrix 814 may be accessed in operation 1210.

In operation 1212, the enhanced blend engine 706 may use the high-level external matrix 814 to determine whether the pixels are non-translucent (e.g., fully opaque macro block or fully transparent macro block).

In operation 1214, if the macro block is non-translucent, the transparency data in the high-level external matrix 814 may be used to blend Plane 0 ARGB/RGB 714 and Plane 1 ARGB/RGB 704 accordingly.

If the macro block is translucent, the enhanced blend engine 706 may determine whether the register bit in the high-level external matrix 814 is set in operation 1216.

In operation 1218, if the register bit in the high-level external matrix 814 not set, the predetermined alpha value may be used to blend Plane 0 ARGB/RGB 714 and Plane 1 ARGB/RGB 704 accordingly.

In operation 1220, if the register bit in the high-level external matrix 814 is set, the detailed external matrix 816 may be accessed. In operation 1222, the transparency data in the detailed external matrix 816 may be used to blend Plane 0 ARGB/RGB 714 and Plane 1 ARGB/RGB 704 accordingly.

To avoid a race condition during updates to lossless areas of a display, a locking mechanism may be utilized, as described above. This race condition may occur if an update happens to the same area that the enhanced blend engine 706 is currently processing. In some embodiments, the locking mechanism may use a row lock register, where each bit of the register signifies a row of the display screen. Upon receipt of data associated with a lossless area of the display screen, the matrix may contain transparency data indicating that area as being opaque. The bits in the row lock register corresponding to that area may also be set such that those areas may not be written to, as shown in FIGS. 10 and 11. The enhanced blend engine 706 may reset the bits in the row lock register after reading the lossless area from the Plane 0 memory such that write operations may occur for areas in the Plane 0 memory (e.g., slow-changing area). The slow-changing plane is not read for composition if the lock bits are in a reset state, indicating that the data from the slow-changing plane has already been read, sent to the frame buffer, and no new data has been added to the slow-changing plane. The enhanced blend engine 706 inserts control data in the FIFO for that area to reduce writes to the frame buffer. This reduces the bandwidth by avoiding Plane 0 reads when not needed (e.g., as opposed to blending when both of the planes are to be read at the speed of the fast-changing plane) and reducing writes to the composite buffer. In some embodiments, the maximum wait period for a rewrite to a particular area may be the frame scan time of the fast-moving display plane.

Figure 13A:
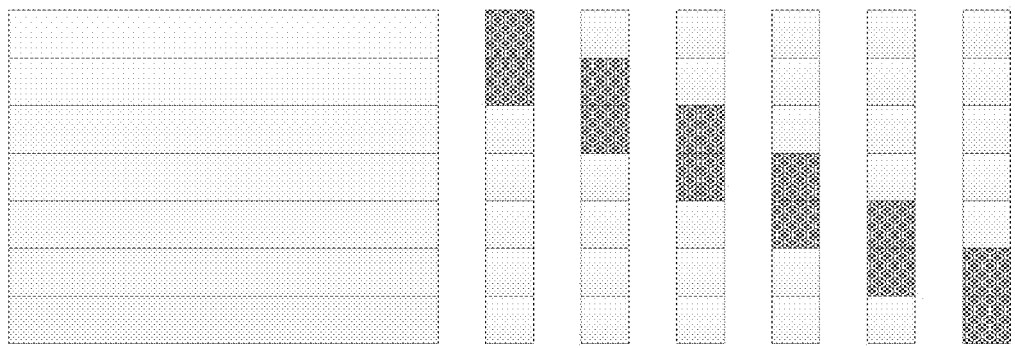
FIGS. 13A-13D illustrate block diagrams of example sliding windows of a display screen that are locked from write operations, according to some embodiments.

In some embodiments, to reduce the wait period for rewrite operations, a sliding window of a particular size (e.g., two rows) may be employed. In this case, a register containing the start row address may be maintained. Using the example of a sliding window of two rows, the use of two rows may help with the next row pre-fetch and may lock two rows at a time. For example, the first row may be the row that is being worked on while the second row may be pre-fetched to guarantee continuous accesses by the enhanced blend engine 706. FIGS. 13A-13D illustrate block diagrams of example sliding windows of a display screen that are locked from write operations. FIG. 13A shows the progression of a sliding window of two macro block rows. In some embodiments, the rewrite wait period may reduce to two rows (e.g., current row address and current row+1 address).

In some embodiments, if more granularity is desired to reduce the wait period further, a column group lock register may be defined in conjunction with the row lock register. Any number of columns may be grouped together to define the sliding window. For example, columns for 1920 pixels by 1080 pixels in the internal matrix may be broken into 30 groups of 64 pixels each, as shown in FIGS. 10 and 11.

Figure 13B:
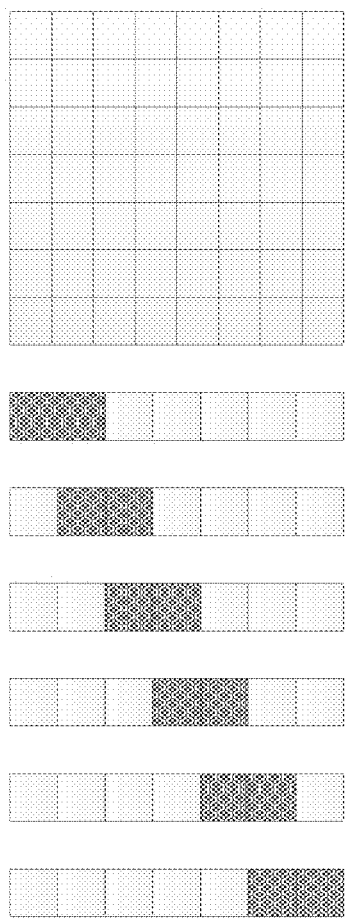

FIG. 13B shows an example of the sliding window with two column groups being used for locking. The column group lock register contents may depend upon the row lock register contents for a particular row. At any point in time, one or two bits may be set in the column group lock register to lock the contents. The sliding window may use two rows and two column groups for locking. A rewrite may be available for any location not locked by the row address register and the column group lock register. In some embodiments, a configuration option may be utilized to define the number of column groups for locking.

Figure 13C:
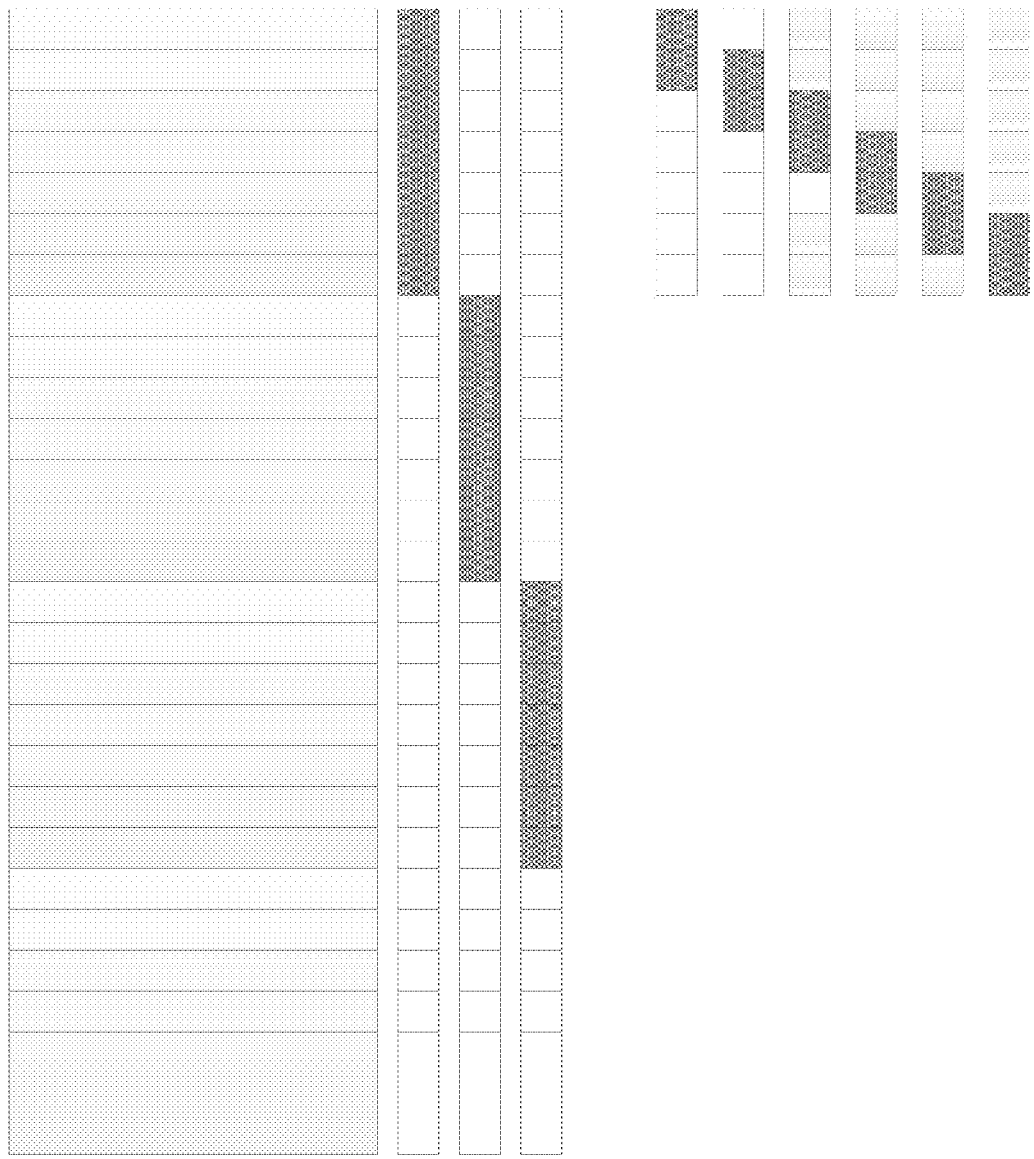

In some embodiments, to reduce the peak bandwidth further, a double sliding window mechanism may be employed. Because human eyes to an extent cannot detect fast changes on a display screen, a limit may be imposed on the window for display of any frame. The limited window area may be considered a second level of sliding windows. For example, a number of rows of the display screen may be broken down into multiple groups (e.g., four groups). With every frame scan, only one such group may be updated to the display screen, and data from Plane 0 memory may be pulled one group at a time. Within the group (e.g., the first level), the sliding window mechanism described above may be utilized. In some embodiments, a timer may be used to update all remaining contents from Plane 0 memory in case the fast-changing plane goes to a pause or stop mode (e.g., video pause or stop). With this approach, the overall peak bandwidth requirement may be reduced. FIG. 13C depicts an example of the double sliding window mechanism described above.

Figure 13D:
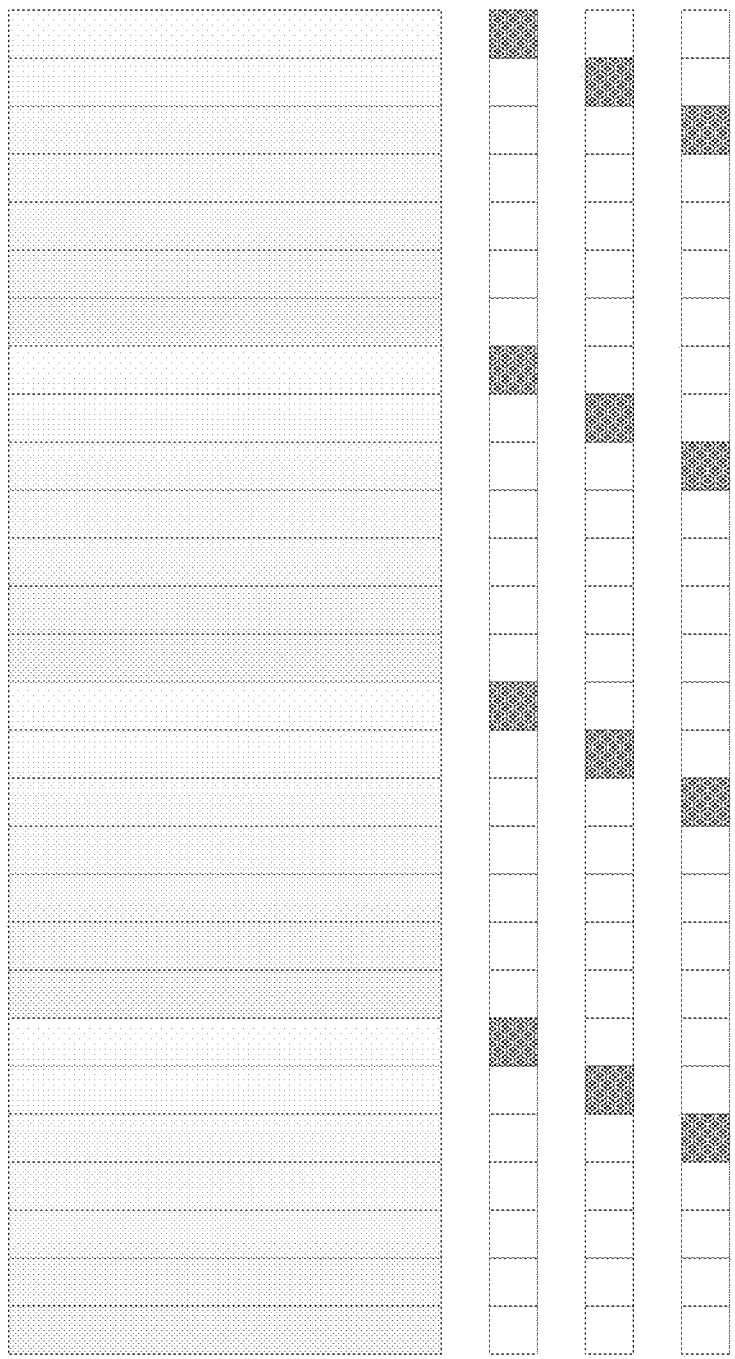

In some embodiments, to reduce peak bandwidth further, the double sliding window may be constructed as a sliding ladder. In some embodiments, each rung of the ladder may be a single row group. This may distribute the peak bandwidth requirement over a larger area. For example, for the internal matrix, 1080 lines for a monitor of resolution 1920 pixels by 1080 pixels may be broken up into four different groups, each having 270 rows. The sliding ladder approach would create a two-row sliding window as {Row0, Row270}, {Row270, Row540}, {Row540, Row710}, and the like. FIG. 13D depicts a representation of this sliding ladder approach.

In some embodiments, a sliding lattice structure may be utilized, which may add on to the sliding ladder structure by reading not only row groups partially but also reading column groups partially.

The preceding technical disclosure is intended to be illustrative and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method, comprising:
   accessing, by a blend device, an internal matrix corresponding to a digital representation of a display screen, the internal matrix being stored in the blend device and having internal transparency data indicating transparency of a macro block of the digital representation;
   reading, by the blend device, one of first display plane data from a first plane or second display plane data from a second plane if the internal matrix indicates the macro block is fully transparent or fully opaque;
   reading, by the blend device, the first display plane data from the first plane and the second display plane data from the second plane if the internal matrix indicates a translucent macro block;
   accessing, by a blend device, a high-level external matrix stored external to the blend device if the internal transparency data indicates the macro block includes a window boundary, the high-level external matrix having high-level external transparency data indicating transparency of each pixel in the macro block;
   reading, by the blend device, one of the first display plane data or the second display plane data if the high-level external transparency data indicates a transparent pixel or an opaque pixel;
   reading, by the blend device, the first display plane data and the second display plane data if the high-level external transparency data indicates a translucent pixel;
   accessing, by a blend device, a detailed external matrix stored external to the blend device, the detailed external matrix having alpha channel values, the detailed external matrix being accessed if:
      the internal transparency data indicates the macro block is translucent; or
      the high-level external transparency data indicates the pixel is translucent;
   blending, by the blend device, the first display plane and the second display plane according to the detailed external transparency data; and
   generating, by the blend device, an image to be displayed on the display screen including generating the image based on at least one of the first display plane data, the second display plane data, and a blend of the first display plane data and the second display plane data.

2. The method of claim 1, wherein the detailed external matrix is accessed if predetermined blend coefficients are not used.

3. The method of claim 1, further comprising:
   sending, by the blend device, the first display plane data to a first display plane buffer corresponding to the first display plane if at least one of the internal transparency data and the high-level external transparency data indicates a transparent pixel.

4. The method of claim 1, further comprising:
   sending, by the blend device, the second display plane data to a second plane buffer corresponding to the second display plane if at least one of the internal transparency data and the high-level external transparency data indicates an opaque pixel.

5. The method of claim 1, further comprising:
   sending, by the blend device, the first plane data to a first plane buffer corresponding to the first display plane and the second plane data to a second plane buffer corresponding to the second display plane if at least one of the internal transparency data and the high-level external transparency data indicates a translucent pixel.

6. The method of claim 1, further comprising:
   inserting, by the blend device, first plane control data into a first plane buffer corresponding to the first display plane if at least one of the internal transparency data and the high-level external transparency data indicates an opaque pixel or a translucent pixel, the first plane control data corresponding to the second display plane data.

7. The method of claim 6, wherein the first plane control data indicates a second plane buffer corresponding to the second display plane should be read.

8. The method of claim 1, further comprising:
   inserting, by the blend device, second plane control data into a second plane buffer corresponding to the second display plane if the second display plane data does not indicate an update.

9. The method of claim 8, wherein the second plane control data indicates the second plane buffer should not be written to a frame buffer in communication with the blend device.

10. The method of claim 1, wherein the first display plane is a fast-changing display plane and wherein the second display plane is a slow-changing display plane.

11. The method of claim 1, further comprising:
    identifying that a register in the internal matrix indicates a predetermined alpha value is to be used, the predetermined alpha value being an average alpha value of the macro block; and
    blending the first display plane data and the second display plane data based on the predetermined alpha value.

12. The method of claim 1, further comprising:
    identifying that a register in the high-level external matrix indicates a predetermined alpha value is to be used, the predetermined alpha value being an average alpha value of the macro block; and
    blending the first display plane data and the second display plane data based on the predetermined alpha value.

13. The method of claim 1, further comprising:
receiving display data associated with the macro block; and
extracting the alpha channel values from the display data, wherein the alpha channel values are used to generate the internal matrix, the high-level external matrix, and the detailed external matrix.

14. The method of claim 1, further comprising:
converting the first display plane data or the second display plane data from a true color mode to a high color mode based on available memory bandwidth.

15. The method of claim 1, wherein blending the first display plane and the second display plane includes converting the first display plane data or the second display plane data from a high color mode to a true color mode.

16. The method of claim 1, wherein blending the first display plane and the second display plane is performed on-the-fly.

17. The method of claim 1, wherein the internal matrix and the high-level external matrix are generated using overlay window coordinates.

18. The method of claim 1, further comprising:
resizing the internal matrix, the high-level external matrix, or the detailed external matrix based on a native resolution size.

19. The method of claim 1, further comprising:
enabling at least one row register bit associated with at least one row of pixels in the second display plane if the at least one row of pixels has been updated, the at least one row register bit indicating that the at least one row of pixels is to be read; and
resetting the at least one row register bit after the at least one row of pixels is read.

20. The method of claim 19, further comprising:
enabling at least one column register bit associated with at least one column of pixels in the second display plane if the at least one column of pixels has been updated, the at least one column register bit indicating that the at least one column of pixels is to be read; and
resetting the at least one column register bit after the at least one column of pixels is read.

21. A device, comprising:
an internal memory having an internal matrix corresponding to a digital representation of a display screen, the internal matrix having internal transparency data indicating transparency of a macro block of the digital representation; and
a hardware-implemented blend module configured to:
access the internal matrix in the internal memory;
read one of first display plane data from a first plane or second display plane data from a second plane if the internal matrix indicates the macro block is fully transparent or fully opaque;
read the first display plane data from the first plane and the second display plane data from the second plane if the internal matrix indicates a translucent macro block;
access a high-level external matrix stored external to the device if the internal transparency data indicates the macro block includes a window boundary, the high-level external matrix having high-level external transparency data indicating transparency of each pixel in the macro block;
read one of the first display plane data or the second display plane data if the high-level external transparency data indicates a transparent pixel or an opaque pixel;
read the first display plane data and the second display plane data if the high-level external transparency data indicates a translucent pixel;
access a detailed external matrix stored external to the device, the detailed external matrix having alpha channel values, the detailed external matrix being accessed if:
the internal transparency data indicates the macro block is translucent; or
the high-level external transparency data indicates the pixel is translucent;
blend the first display plane and the second display plane according to the detailed external transparency data; and
generate an image to be displayed on the display screen including generating the image based on at least one of the first display plane data, the second display plane data, and a blend of the first display plane data and the second display plane data.

22. The device of claim 21, wherein the detailed external matrix is accessed if predetermined blend coefficients are not used.

23. The device of claim 21, wherein the hardware-implemented blend module is further configured to:
send the first display plane data to a first display plane buffer corresponding to the first display plane if at least one of the internal transparency data and the high-level external transparency data indicates a transparent pixel.

24. The device of claim 21, wherein the hardware-implemented blend module is further configured to:
send the second display plane data to a second plane buffer corresponding to the second display plane if at least one of the internal transparency data and the high-level external transparency data indicates an opaque pixel.

25. The device of claim 21, wherein the hardware-implemented blend module is further configured to:
send the first plane data to a first plane buffer corresponding to the first display plane and the second plane data to a second plane buffer corresponding to the second display plane if at least one of the internal transparency data and the high-level external transparency data indicates a translucent pixel.

26. The device of claim 21, wherein the hardware-implemented blend module is further configured to:
insert first plane control data into a first plane buffer corresponding to the first display plane if at least one of the internal transparency data and the high-level external transparency data indicates an opaque pixel or a translucent pixel, the first plane control data corresponding to the second display plane data.

27. The device of claim 26, wherein the first plane control data indicates a second plane buffer corresponding to the second display plane should be read.

28. The device of claim 21, wherein the hardware-implemented blend module is further configured to:
insert second plane control data into a second plane buffer corresponding to the second display plane if the second display plane data does not indicate an update.

29. The device of claim 28, wherein the second plane control data indicates the second plane buffer should not be written to a frame buffer in communication with the device.

30. The device of claim 21, wherein the first display plane is a fast-changing display plane and wherein the second display plane is a slow-changing display plane.

31. The device of claim 21, wherein the hardware-implemented blend module is further configured to:

identify that a register in the internal matrix indicates a predetermined alpha value is to be used, the predetermined alpha value being an average alpha value of the macro block; and blend the first display plane data and the second display plane data based on the predetermined alpha value.

32. The device of claim 21, wherein the hardware-implemented blend module is further configured to:

identify that a register in the high-level external matrix indicates a predetermined alpha value is to be used, the predetermined alpha value being an average alpha value of the macro block; and blend the first display plane data and the second display plane data based on the predetermined alpha value.

33. The device of claim 21, wherein the hardware-implemented blend module is further configured to:

receive display data associated with the macro block; and extract the alpha channel values from the display data, wherein the alpha channel values are used to generate the internal matrix, the high-level external matrix, and the detailed external matrix.

34. The device of claim 21, wherein the hardware-implemented blend module is further configured to:

convert the first display plane data or the second display plane data from a true color mode to a high color mode based on available memory bandwidth.

35. The device of claim 21, wherein blending the first display plane and the second display plane includes converting the first display plane data or the second display plane data from a high color mode to a true color mode.

36. The device of claim 21, wherein blending the first display plane and the second display plane is performed on-the-fly.

37. The device of claim 21, wherein the internal matrix and the high-level external matrix are generated using overlay window coordinates.

38. The device of claim 21, wherein the hardware-implemented blend module is further configured to:

resize the internal matrix, the high-level external matrix, or the detailed external matrix based on a native resolution size.

39. The device of claim 21, wherein the hardware-implemented blend module is further configured to:

enable at least one row register bit associated with at least one row of pixels in the second display plane if the at least one row of pixels has been updated, the at least one row register bit indicating that the at least one row of pixels is to be read; and reset the at least one row register bit after the at least one row of pixels is read.

40. The device of claim 39, wherein the hardware-implemented blend module is further configured to:

enable at least one column register bit associated with at least one column of pixels in the second display plane if the at least one column of pixels has been updated, the at least one column register bit indicating that the at least one column of pixels is to be read; and reset the at least one column register bit after the at least one column of pixels is read.

41. A device, comprising:

means for accessing an internal matrix corresponding to a digital representation of a display screen, the internal matrix being stored in the device and having internal transparency data indicating transparency of a macro block of the digital representation;

means for reading one of first display plane data from a first plane or second display plane data from a second plane if the internal matrix indicates the macro block is fully transparent or fully opaque;

means for reading the first display plane data from the first plane and the second display plane data from the second plane if the internal matrix indicates a translucent macro block;

means for accessing a high-level external matrix stored external to the device if the internal transparency data indicates the macro block includes a window boundary, the high-level external matrix having high-level external transparency data indicating transparency of each pixel in the macro block;

means for reading one of the first display plane data or the second display plane data if the high-level external transparency data indicates a transparent pixel or an opaque pixel;

means for reading the first display plane data and the second display plane data if the high-level external transparency data indicates a translucent pixel;

means for accessing a detailed external matrix stored external to the device, the detailed external matrix having alpha channel values, the detailed external matrix being accessed if:

the internal transparency data indicates the macro block is translucent; or the high-level external transparency data indicates the pixel is translucent;

means for blending the first display plane and the second display plane according to the detailed external transparency data; and means for generating an image to be displayed on the display screen including generating the image based on at least one of the first display plane data, the second display plane data, and a blend of the first display plane data and the second display plane data.

42. The device of claim 41, wherein the detailed external matrix is accessed if predetermined blend coefficients are not used.

43. The device of claim 41, further comprising:

means for sending the first display plane data to a first display plane buffer corresponding to the first display plane if at least one of the internal transparency data and the high-level external transparency data indicates a transparent pixel.

44. The device of claim 41, further comprising:

means for sending the second display plane data to a second plane buffer corresponding to the second display plane if at least one of the internal transparency data and the high-level external transparency data indicates an opaque pixel.

45. The device of claim 41, further comprising:

means for sending the first plane data to a first plane buffer corresponding to the first display plane and the second plane data to a second plane buffer corresponding to the second display plane if at least one of the internal transparency data and the high-level external transparency data indicates a translucent pixel.

46. The device of claim 41, further comprising:

means for inserting first plane control data into a first plane buffer corresponding to the first display plane if at least one of the internal transparency data and the high-level external transparency data indicates an opaque pixel or a translucent pixel, the first plane control data corresponding to the second display plane data.

47. The device of claim 46, wherein the first plane control data indicates a second plane buffer corresponding to the second display plane should be read.

48. The device of claim 41, further comprising:
means for inserting second plane control data into a second plane buffer corresponding to the second display plane if the second display plane data does not indicate an update.

49. The device of claim 48, wherein the second plane control data indicates the second plane buffer should not be written to a frame buffer in communication with the device.

50. The device of claim 41, wherein the first display plane is a fast-changing display plane and wherein the second display plane is a slow-changing display plane.

51. The device of claim 41, further comprising:
means for identifying that a register in the internal matrix indicates a predetermined alpha value is to be used, the predetermined alpha value being an average alpha value of the macro block; and
means for blending the first display plane data and the second display plane data based on the predetermined alpha value.

52. The device of claim 41, further comprising:
means for identifying that a register in the high-level external matrix indicates a predetermined alpha value is to be used, the predetermined alpha value being an average alpha value of the macro block; and
means for blending the first display plane data and the second display plane data based on the predetermined alpha value.

53. The device of claim 41, further comprising:
means for receiving display data associated with the macro block; and
means for extracting the alpha channel values from the display data, wherein the alpha channel values are used to generate the internal matrix, the high-level external matrix, and the detailed external matrix.

54. The device of claim 41, further comprising:
means for converting the first display plane data or the second display plane data from a true color mode to a high color mode based on available memory bandwidth.

55. The device of claim 41, wherein blending the first display plane and the second display plane includes converting the first display plane data or the second display plane data from a high color mode to a true color mode.

56. The device of claim 41, wherein blending the first display plane and the second display plane is performed on-the-fly.

57. The device of claim 41, wherein the internal matrix and the high-level external matrix are generated using overlay window coordinates.

58. The device of claim 41, further comprising:
means for resizing the internal matrix, the high-level external matrix, or the detailed external matrix based on a native resolution size.

59. The device of claim 41, further comprising:
enabling at least one row register bit associated with at least one row of pixels means for in the second display plane if the at least one row of pixels has been updated, the at least one row register bit indicating that the at least one row of pixels is to be read; and
means for resetting the at least one row register bit after the at least one row of pixels is read.

60. The device of claim 59, further comprising:
means for enabling at least one column register bit associated with at least one column of pixels in the second display plane if the at least one column of pixels has been updated, the at least one column register bit indicating that the at least one column of pixels is to be read; and
means for resetting the at least one column register bit after the at least one column of pixels is read.

\* \* \* \* \*